United States Patent [19]
Ohuchi et al.

[11] Patent Number: 5,640,846
[45] Date of Patent: Jun. 24, 1997

[54] DUAL-SENSOR TYPE AIR-FUEL RATIO CONTROL SYSTEM FOR INTERNAL COMBUSTION ENGINE AND CATALYTIC CONVERTER DIAGNOSIS APPARATUS FOR THE SAME

[75] Inventors: Hirofumi Ohuchi; Shinya Fujimoto, both of Himeji, Japan

[73] Assignee: Mitsubishi Denki Kabushiki Kaisha, Tokyo, Japan

[21] Appl. No.: 420,736

[22] Filed: Apr. 11, 1995

Related U.S. Application Data

[62] Division of Ser. No. 308,510, Sep. 21, 1994, which is a division of Ser. No. 133,983, Oct. 8, 1993, Pat. No. 5,363,647.

[30] Foreign Application Priority Data

Oct. 13, 1992 [JP] Japan .................. 4-274337
Oct. 15, 1992 [JP] Japan .................. 4-277444
Oct. 21, 1992 [JP] Japan .................. 4-283182

[51] Int. Cl.[6] ........................................... F01N 3/28
[52] U.S. Cl. ................................. 60/276; 60/285
[58] Field of Search ....................... 60/274, 276, 285

[56] References Cited

U.S. PATENT DOCUMENTS

| | | | |
|---|---|---|---|
| 3,939,654 | 2/1976 | Creps | 60/276 |
| 4,251,989 | 2/1981 | Norimatsu | 60/285 |
| 5,060,473 | 10/1991 | Nakagawa | 60/277 |
| 5,115,639 | 5/1992 | Gopp | 60/276 |
| 5,207,056 | 5/1993 | Benninger | 60/285 |
| 5,224,345 | 7/1993 | Schnaibel | 60/285 |
| 5,279,114 | 1/1994 | Kurita | 60/277 |
| 5,280,707 | 1/1994 | Nakashima | 60/285 |
| 5,301,501 | 4/1994 | Shimizu | 60/276 |
| 5,307,625 | 5/1994 | Junginger | 60/276 |
| 5,311,737 | 5/1994 | Komatsu | 60/277 |

Primary Examiner—Douglas Hart
Attorney, Agent, or Firm—Sughrue, Mion, Zinn, Macpeak & Seas

[57] ABSTRACT

A dual-sensor type air-fuel ratio control system for an internal combustion engine. A catalytic converter 10 is disposed in an exhaust pipe 9, together with a first upstream air-fuel ratio sensor 11 and a second, downstream air-fuel ratio sensor 12. An electronic unit 30A controls the air-fuel ratio of a mixture supplied to the engine, and includes first and second arithmetic circuits 51, 52 for determining first and second air-fuel ratio control quantities Cf1, C2' on the basis of the first and second air-fuel ratio signals V1, V2, and a circuit 53, 54 for correcting the first control quantity with the second one to determine a target air-fuel ratio control quantity J for the fuel injection. A filter 50 is provided for the first air-fuel ratio signal to compensate for variations in the output characteristic of the first sensor.

5 Claims, 29 Drawing Sheets

IN NORMAL STATE OF CATALYST

DUAL-SENSOR TYPE AIR-FUEL RATIO CONTROL SYSTEM FOR INTERNAL COMBUSTION ENGINE AND CATALYTIC CONVERTER DIAGNOSIS APPARATUS FOR THE SAME

This is a divisional of application Ser. No. 08/308,510 filed Sep. 21, 1994, which is a Divisional of application Ser. No. 08/133,983 filed Oct. 8, 1993, now U.S. Pat. No. 5,363,647.

BACKGROUND OF THE INVENTION

1. Field of the Invention

The present invention relates to an air-fuel ratio control system for an internal combustion engine which is adapted to perform an air-fuel feedback control on the basis of air-fuel ratio signals generated by a pair of air-fuel ratio sensors mounted in an exhaust pipe at positions upstream and downstream of an exhaust gas purifying catalytic converter, respectively. More particularly, the invention is concerned with an air-fuel ratio control system which is capable of suppressing control errors brought about due to variation or deterioration of the operating (output) characteristic and/or response time of the air-fuel ratio sensor disposed upstream of the catalytic converter and which can prevent occurrence of delay and overshoot in the air-fuel ratio control. Further, the invention is concerned with an apparatus for detecting deterioration of an exhaust gas purifying catalytic converter on the basis of the output signals of the two air-fuel ratio sensors.

2. Description of the Related Art

In general, the amount of fuel injected into the internal combustion engine (hereinafter also referred to simply as the engine) is controlled through a feedback control loop on the basis of an output signal of an air-fuel ratio sensor such as $O_2$-sensor mounted in an exhaust pipe so that the air-fuel ratio (A/F) of the air-fuel mixture assumes a stoichiometrically optimal value (typically a value of about 14.7) for the prevailing operation state of the engine.

Oxygen concentration of the exhaust gas is usually low when the air-fuel ratio of the fuel mixture assumes a value which is smaller than the above-mentioned value of 14.7, indicating that the fuel mixture is rich, and if otherwise, the oxygen concentration is high. Accordingly, the air-fuel ratio sensor such as the $O_2$-sensor is so designed as to respond to the oxygen concentration of the exhaust gas by changing correspondingly the voltage level of the output signal of the sensor within a range from 0 to 1 volt around the level corresponding to the air-fuel ratio of 14.7. By way of example, when the air-fuel ratio indicates an excess of fuel (i.e., rich mixture with excess fuel), the voltage level of the output signal of the air-fuel ratio sensor ($O_2$-sensor) increases correspondingly in response to decrease in the oxygen concentration.

In the air-fuel ratio control system in which a single air-fuel ratio sensor is installed in the exhaust pipe at a position upstream from the catalytic converter, the accuracy of the air-fuel ratio control is affected remarkably by a change or deterioration of the output characteristic (operating or performance characteristic) of the air-fuel ratio sensor. More specifically, the operating characteristic of the air-fuel ratio sensor may differ from one to another sensor due to manufacturing tolerances (dispersion of the operating characteristic) and/or undergo deterioration in the course of time lapse. Under the circumstances, there has been proposed such an air-fuel ratio control system in which an additional air-fuel ratio sensor is provided at a position downstream from the catalytic converter for the purpose of correcting or improving the air-fuel ratio feedback control performed on the basis of the air-fuel ratio signal outputted from the air-fuel ratio sensor disposed upstream of the catalytic converter. In this regard, it is noted that the air-fuel ratio sensor disposed downstream of the catalytic converter detects the air-fuel ratio of the exhaust gas which has already undergone the catalytic reaction and which has a substantially uniform or constant oxygen concentration. Thus, the downstream sensor is less susceptible to deterioration or degradation of the operating (or output) characteristic thereof. For this reason, the dual-sensor type air-fuel ratio control system can perform the air-fuel ratio feedback control with significantly enhanced accuracy when compared with the single-sensor type control system. In other words, dispersion of the operating characteristics of the upstream air-fuel ratio sensor and the fuel injector as well as the time-dependent deterioration or degradation thereof can successfully be compensated for by utilizing the output signal of the downstream air-fuel ratio sensor. A typical one of such dual-sensor type air-fuel ratio control system is disclosed, for example, in U.S. Pat. No. 3,939,654.

For better understanding of the present invention, the background techniques will be elucidated below in some detail.

FIG. 24 is a block diagram showing a typical one of the conventional air-fuel ratio control system for an internal combustion engine in which a pair of air-fuel ratio sensors are disposed in an exhaust pipe upstream and downstream from a catalytic converter, respectively.

Referring to FIG. 24, an internal combustion engine (hereinafter referred to simply as the engine) 1 is provided with an intake pipe 2 for supplying an air-fuel mixture to the engine 1, an air cleaner 3 disposed at an inlet port of the intake pipe 2, an intake manifold 4 formed at a junction between the intake pipe 2 and the engine 1 and a fuel injector 5 mounted in the intake pipe 2 at a position upstream of a throttle valve 7. Further, mounted in the intake manifold 4 is a semiconductor-type pressure sensor 6 for detecting a pressure P within the manifold 4. This pressure P indicates an amount of the air-fuel mixture supplied to the engine 1 from the intake pipe 2 through the manifold 4. A throttle sensor 8 is provided in association with the throttle valve 7 for detecting the throttle opening degree $\phi$. The engine 1 is further equipped with an exhaust pipe 9 for discharging an exhaust gas resulting from combustion of the air-fuel mixture within the engine. A ternary catalytic converter 10 is installed in the exhaust pipe 9 for eliminating three poisonous components HC, CO and $NO_x$ from the exhaust gas. A first air-fuel ratio sensor 11 (typically an $O_2$-sensor) is mounted in the exhaust pipe 9 at a position upstream of the catalytic converter 10 with a second air-fuel ratio sensor 12 (typically an $O_2$-sensor) being disposed downstream of the catalytic converter 10.

For the control of the engine operation, there is provided an electronic control unit (ECU) 20 having an input terminal to which an ignition coil 13 composed of a boosting transformer and an igniter 14 constituted by a power transistor for interrupting electric conduction through a primary winding of the ignition coil 13 is connected. An idle switch 15 which serves to detect the idling operation state of the engine in which the throttle valve 7 is fully closed is provided integrally with the throttle sensor 8, wherein the output signals D and $\phi$ of both the idle switch 15 and the throttle sensor 8 are supplied to the electronic control unit 20. Supplied additionally to the electronic control unit 20 are an output signal T of a thermistor-type water temperature sensor 16 which is employed for detecting the temperature T of the engine cooling water and an output signal P of the pressure sensor 6 mentioned above. An electric power for the electronic control unit 20 and other components is supplied from an onboard battery 17 via a key switch 18. An alarm lamp 19 driven upon detection of abnormality such as deterioration of the catalytic converter and the like (indicated by a signal E) is connected to an output terminal of the electronic control unit 20. Further, a vehicle speed sensor 40 for detecting a speed of a motor vehicle is installed in association with an axle. It goes without saying that the operation of the fuel injector 5 is controlled by the electronic control unit 20 in dependence on the running or operation state of the engine 1 while taking into account the air-fuel ratio detected by the sensors 11 and 12.

As will be apparent from the above description, the electronic control unit 20 receives as the engine operation state indicating parameters or quantities a variety of input signals including the throttle opening signal φ from the throttle sensor 8, the pressure signal P from the pressure sensor 6 indicating the pressure within the intake manifold 4, the coolant water temperature signal T from the water temperature sensor 16, the idle signal D from the idle switch 15, a vehicle speed signal S from the 40, a rotation or interrupt signal R generated upon every interruption of the electric conduction of the ignition coil 13 and serving as an interrupt signal, as described later on, and air-fuel ratio signals V1 and V2 supplied from the first and second air-fuel ratio sensors 11 and 12, respectively.

Operation of the electronic control unit 20 which may be realized on the basis of microcomputer techniques is activated in response to the power supply from the battery 17 which is enabled by closing the key switch 18, whereby the aforementioned engine operation state signals inclusive of the air-fuel ratio signals V1 and V2 are supplied to the electronic control unit 20, whereby a fuel injection control signal J is generated under the control through an air-fuel ratio feedback control loop. The abnormality signal E for lighting the alarm lamp 19 is generated upon detection of occurrence of abnormality (such as deterioration of the catalytic converter) in the engine operation.

FIG. 25 is a block diagram showing a functional configuration of the electronic control unit 20. As can be seen in the figure, the electronic control unit 20 includes a microcomputer 30, a first input interface 21 for receiving the rotation signal R to thereby generate an interrupt signal INT by shaping the waveform of the former, a second input interface 22 through which the air-fuel ratio signals V1 and V2, the pressure signal P, the cooling water temperature signal T and the throttle opening signal φ are fetched, a third input interface 23 for fetching the idle signal D and the vehicle speed signal S, an output interface 24 for outputting the abnormality signal E and the fuel injection control signal J, and a power supply circuit 25 connected to the battery 17 via the key switch 18, wherein the microcomputer 30 is connected to the input interfaces 21, 22 and 23, the output interface 24 and the power supply circuit 25.

The microcomputer 30 is comprised of a central processing unit (CPU) 31 for determining arithmetically or calculating an air-fuel ratio feedback control quantity (hereinafter also referred to as the air-fuel ratio control quantity) on the basis of the air-fuel ratio signals V1 and V2, a free-running counter 32 for detecting a rotation speed of the engine 1 on the basis of the rotation signal R and hence the interrupt signal INT fetched through the first input interface 21, a timer 33 for timing the various control operations, an analogue-to-digital or A/D converter 34 for converting the analogue signals inputted through the second input interface 22 (i.e., the air-fuel ratio signals V1 and V2, the pressure signal P, the cooling water temperature signal T and the throttle opening signal φ) into corresponding digital signals, an input port 35 for fetching the idle signal D and the vehicle speed signal S through the third interface 23, a random access memory or RAM 36 used as a work area for the CPU 31, a read-only memory or ROM 37 for storing programs in accordance with which the CPU 31 performs various operations, an output port 38 for outputting the fuel injection control signal J and the emergency or abnormality signal E, and a common bus 39 through which the various constituents 32 to 38 mentioned above are coupled to the CPU 31 for interactions therewith.

In response to the interrupt signal INT inputted through the first input interface 21, the CPU 31 reads a count value from the counter 32 and computes the rotation period or speed (rpm) of the engine 1 on the basis of a difference between the current count value and the preceding count value read upon input of the preceding interrupt signal INT. The engine rotation period thus determined is stored in the RAM 36.

The output interface 24 serves to amplify the control signal supplied from the output port 38 to thereby generate the fuel injection control signal J as well as the abnormality signal E, as occasion requires.

FIG. 26 is a functional block diagram showing schematically functions involved in the air-fuel ratio feedback control performed by the microcomputer 30 of the conventional electronic control unit. In this figure, reference numeral 41 denotes a first PI controller for effecting a PI (proportional-pulse-integral) action or control for the air-fuel ratio signal V1 supplied from the first or upstream air-fuel ratio sensor 11. Further, reference numeral 42 denotes a second PI controller for effecting a PI action or control for the air-fuel ratio signal V2 supplied from the second or downstream air-fuel ratio sensor 12.

Each of the PI controllers 41 and 42 constitutes an arithmetic means for generating air-fuel ratio control quantities C1 and C2 on the basis of the air-fuel signals V1 and V2, respectively, wherein the second air-fuel ratio control quantity C2 is used as an air-fuel ratio correcting quantity for correcting the first air-fuel ratio control quantity C1. On the other hand, the first air-fuel ratio control quantity C1 serves as an air-fuel ratio correcting quantity for correcting the air-fuel ratio V1 through a feedback control described hereinafter. The fuel injection control signal J ultimately generated on the basis of the control quantity C1 is supplied to the fuel injector 5 through the feedback control which controls the fuel injection so that the second air-fuel ratio signal V2 coincides with a desired or target value (second target value) VR2 set for the second air-fuel ratio sensor 12.

More specifically, for the first and the second air-fuel ratio signals V1 and the V2, there are previously determined and set first and second target values VR1 and VR2 for the air-fuel ratio control, respectively, for each of which a voltage value substantially corresponding to an stoichiometrically optimal air-fuel ratio 14.7 is set. However, the voltage value for the second target value VR2 may be set slightly higher than the first target value VR1 so as to indicate an air-fuel ratio smaller than 14.7 (i.e., excess in fuel).

A basic fuel amount signal FR shown in FIG. 26 is arithmetically determined on the basis of the pressure signal P (FIGS. 24, 25) which represents equivalently the amount of intake air. Further, in FIG. 26, reference symbols CF designates a fuel injection correcting quantity determined on the basis of the water temperature signal T and the throttle opening signal φ in the acceleration/deceleration mode of the engine, KF designates an injection time correcting coefficient for the fuel injector 5 for correcting the fuel injection time or period on the basis of a desired amount of fuel injection, and Q designates a dead time correcting quantity for correcting the driving time of the fuel injector 5 by taking into account the dead time.

In operation, a difference ΔV2 between the second target value VR2 and the second air-fuel ratio signal V2 is determined by a subtractor 43 and applied to the input of the second PI controller 42. The second air-fuel ratio control quantity C2 outputted from the controller 42 after undergoing the PI action is added to the first target value VR1 by an adder 44, whereby a correction target quantity VT1 is generated. Further, a difference ΔV1 between the correction target quantity VT1 and the first air-fuel ratio signal V1 is determined by a subtractor 45 and inputted to the first PI controller 41. The adder 44 thus constitutes a correcting means for correcting the first air-fuel ratio control quantity C1 determined by the first PI controller 41 by utilizing the second air-fuel ratio control quantity C2.

The first air-fuel ratio control quantity C1 outputted from the first PI controller 41 is multiplied by the basic fuel amount FR in a multiplier 46, whereby a target fuel amount signal F1 is generated to be subsequently multiplied by the fuel correction quantity CF in a multiplier 47, as a result of which a signal representing a corrected fuel amount signal F is generated. The corrected fuel amount signal F is multiplied by the fuel injection time KF by a multiplier 48, whereby a signal indicating a driving time G for the fuel injector 5 is generated. The dead time correction quantity Q is added to the driving time signal G by an adder 49, which results in generation of the fuel injection control signal J to be ultimately obtained. The multipliers 46 to 48 and the adder 49 constitute a control quantity conversion means for converting the first air-fuel ratio control quantity C1 into the fuel injection control signal J.

Next, referring to FIG. 24 to 26 along with a waveform diagram shown in FIG. 27, operation of the air-fuel ratio control system known heretofore will be described in detail.

The subtractor 43 determines a deviation or difference ΔV2(=VR2−V2) by comparing the second air-fuel ratio signal V2 derived from the output of the second air-fuel ratio sensor 12 installed downstream of the catalytic converter 10 with the second target value VR2, while the second PI controller 42 computes or arithmetically determines the second air-fuel ratio control quantity C2 through the PI action performed on the difference ΔV2.

On the other hand, the adder 44 adds the second air-fuel ratio control quantity C2 (i.e., a correcting quantity) to the first target value VR1, to thereby generate the correction target quantity VT1(=VR1+C2) for the output V1 of the first air-fuel ratio sensor 11. Further, the subtractor 45 determines a deviation or difference ΔV1(=VT1−V1) by comparing the correction target quantity VT1 with the first air-fuel ratio signal V1 of the first air-fuel ratio sensor 11 disposed upstream of the catalytic converter 10, while the first PI controller 41 determines the first air-fuel ratio control quantity C1 for the feedback control by performing PI action on the difference ΔV1.

In this manner, the first air-fuel ratio control quantity C1 which is based on the first air-fuel ratio signal V1 is derived through the correction based on the second air-fuel ratio control quantity C2, whereby the ultimate air-fuel ratio-control quantity (fuel injection control quantity) J is obtained through the subsequent processings performed by the control quantity conversion means (46–49), as mentioned previously.

As is shown in FIG. 27, the signal representing the first air-fuel ratio control quantity C1 has a waveform approximately similar to that of the first air-fuel ratio signal V1 in respect to the period and the number of times at which the former intersects the correction target quantity VT1. On the other hand, the second air-fuel ratio signal V2 changes gently or flatly around the target value VR2.

In the meanwhile, on the basis of the pressure signal P derived from the output of the pressure sensor 6, the intake air amount is detected, on the basis of which the basic fuel amount FR is determined. The first air-fuel ratio control quantity C1 is multiplied by the basic fuel amount FR by means of the multiplier 46 to thereby determine the target fuel amount F1, as mentioned previously.

Subsequently, on the basis of the temperature T, a correcting quantity indicative of the warmed-up state of the engine 1 is fetched, which is then followed by detection of the acceleration/deceleration state of the engine 1 on the basis of the throttle opening degree φ derived from the output of the throttle sensor 8, whereby the fuel injection correcting quantity CF is determined by taking into account a correcting quantity which reflects the engine acceleration/deceleration state. The target fuel amount F1 is then multiplied by the fuel injection correcting quantity CF, to thereby determine the corrected fuel injection amount F which represents the fuel injection amount to be ultimately determined.

The multiplier 48 multiplies the corrected fuel injection amount F by the fuel injection time correcting coefficient KF to thereby determine the driving time G of the fuel injector 5, while the adder 49 adds the dead time correction quantity Q to the driving time G to determine the ultimate fuel injection control signal J for controlling the fuel injector 5.

As is apparent from the above description, the air-fuel ratio feedback control is performed such that the air-fuel ratio signal V2 outputted from the second air-fuel ratio sensor 12 disposed downstream of the catalytic converter 10 can take the second target value VR2 by correcting the first target value VR1 for the first air-fuel ratio sensor 11 with the correcting quantity VT1 generated on the basis of the second air-fuel ratio signal V2 outputted from the second air-fuel ratio sensor 12. By way of example, when the second air-fuel ratio signal V2 of the second air-fuel ratio sensor 12 disposed downstream of the catalytic converter 10 indicates that the air-fuel ratio is smaller than 14.7 and hence the air-fuel mixture is rich, duration of the fuel injection control signal J is so set as to become shorter, whereby the fuel injection is controlled so that the air-fuel mixture becomes lean.

At this juncture, it is however noted that the first air-fuel ratio sensor 11 as well as the second air-fuel ratio sensor 12 can not evade dispersion in the operating or output characteristic, as pointed out hereinbefore. In other words, the operating characteristics of these sensors may differ from one to another due to intrinsic error or tolerance in the manufacturing. Besides, the operating characteristic of the first air-fuel ratio sensor 11 disposed upstream of the catalytic converter 10 undergoes change or degradation as a function of time due to exposure to the poisonous components contained in the exhaust as. Next, problems which may be brought about by the dispersion or deviation of the operating characteristic of the sensor as well as deterioration of the sensor element will be elucidated below.

FIG. 28 is a waveform diagram which illustrates in what manner the air-fuel ratio sensors of different characteristics respond in case the air-fuel ratio (A/F) is forcibly changed. More specifically, a waveform Va of FIG. 28 represents a response characteristic of a standard air-fuel ratio sensor having a standard response characteristic, a waveform Vb represents a response characteristic of an air-fuel ratio sensor exhibiting an operating characteristic deviated form that of the standard, and a waveform Vc represents a response characteristic of an air-fuel ratio sensor undergone deterioration or degradation.

Referring to FIG. 28, the air-fuel ratio (A/F) was changed from a value indicating a lean mixture to a value corresponding to a rich mixture around the target value (or stoichiometrically optimal) value of 14.7. In that case, the air-fuel ratio sensor having the standard characteristic Va responds with a delay time of about 100 milliseconds, as can be seen from the curve Va. On the other hand, the air-fuel ratio sensor having the response characteristic Vb deviated from the standard responds with a delay of about 200 milliseconds, as indicated by the curve Vb. Finally, the response of the air-fuel ratio sensor of the deteriorated the characteristic takes as long a time as about 1.2 second at maximum, as indicated by a curve Vc.

FIG. 29 is a waveform diagram for illustrating air-fuel ratio feedback control operations effected when the air-fuel ratio sensors having the response characteristics Va to Vc shown in FIG. 28 are, respectively, used as the first air-fuel ratio sensor 11.

Referring to FIG. 29, it is assumed that the first target value VR1 for the first air-fuel ratio signal V1 has a value α with the correction target quantity VT1 having a value β and that the value of the first target value VR1 is to be corrected from the value α to β by utilizing the air-fuel ratio control quantity C2 which is based on the second air-fuel ratio signal V2. More specifically, it is assumed that the second air-fuel ratio signal V2 indicates that the air-fuel mixture is richer than that corresponding to the second target value VR2 (the second air-fuel ratio signal V2 is of a higher voltage than the signal representing the value VR2), wherein the second air-fuel ratio control quantity C2 of a negative (minus) value is added to the first target value VR1 to thereby lower the first target value VR1, so that the air-fuel ratio as detected indicates a lean air-fuel mixture (this ratio will hereinafter be referred to as the lean air-fuel ratio).

In FIG. 29, reference symbols Tα and Tβ represent the times taken for the comparisons of the first air-fuel ratio signal V1 with the correction target values α and β, respectively, to determine richness of the air-fuel mixture (the time involved in this decision will hereinafter be referred to as the richness decision time).

The first air-fuel ratio control quantity C1 which is based on the output of the first air-fuel ratio sensor 11 having the standard characteristic (Va) mentioned above changes in such a manner as indicated by a broken line curve, when the richness decision takes a time Tβ which is longer than Tα for deciding that the air-fuel mixture becomes lean.

Similarly, it is assumed that when the first air-fuel ratio sensor 11 having the output characteristic Vb (the characteristic deviated from the standard) or the first air-fuel ratio sensor 11 exhibiting the characteristic Vc (due to deterioration of the sensor element) is used and that the richness decision time is changed from Tα to Tβ. In this case, it is however noted that because of differences in the output characteristics of these air-fuel ratio sensors as indicated by a broken curve Vb and a dot-broken curve Vc, respectively, the response times of these sensors differ from each other and from that of the standard sensor (Va), as a result of which difference of the change (Tβ−Tα) in the rich decision time differs between the case where the first air-fuel ratio sensor 11 having the standard characteristic (Va) is used and the case where the first air-fuel ratio sensor 11 having the deviated characteristic (Vb) or the degraded characteristic (Vc) is employed.

As will be understood from the foregoing, when the output characteristic of the first air-fuel ratio sensor 11 differs from that of the sensor having the standard characteristic, the difference between the richness decision times Tα and Tβ is deviated from that of the standard sensor correspondingly in dependence on magnitude of the difference (β−α) of the first target value VR1 due to correction thereof by the second air-fuel ratio control quantity C2. This means that the first air-fuel ratio control quantity C1 determined ultimately differs correspondingly from that obtained when the air-fuel ratio sensor of the standard characteristic is used as the first air-fuel ratio sensor 11.

As is apparent from the above description, when the output characteristic and the response time of the first air-fuel ratio sensor 11 are deviated from the standard or deteriorated as a function of time lapse, the first air-fuel ratio control quantity C1 obtained on the basis of the first target value VR1 corrected by the second air-fuel ratio control quantity C2 becomes different from that of the air-fuel ratio sensor of the standard characteristic, ultimately making it impossible to correct the air-fuel ratio in a satisfactory manner. More specifically, when the first air-fuel ratio sensor 11 having the standard output characteristic (Va) is used, the response time is comparatively short. As a consequence, the richness decision time based on the second air-fuel ratio control quantity C2 and the first target value VR1 is short. This means that the second air-fuel ratio control quantity C2 for the first target value VR1 should be set at a greater value for the correct air-fuel ratio control. On the other hand, when the first air-fuel ratio sensor 11 having the degraded output characteristic (Vc) is used, the rich decision time becomes longer than the case where the first air-fuel ratio sensor 11 having the standard output characteristic (Va) is used, making it impossible to realize the appropriate air-fuel ratio control with the control quantity C2 set for the standard characteristic. Same holds true also for the first air-fuel ratio sensor having the deviated characteristic (Vb). Moreover, since the first air-fuel ratio sensor 11 disposed upstream of the catalytic converter 10 is easily susceptible to deterioration, the unwanted changes will take place in the first air-fuel ratio control quantity C1, which can not be neglected.

As will now be appreciated from the foregoing description, the air-fuel ratio control system for the engine known heretofore suffers from a problem that magnitude of the first air-fuel ratio control quantity C1 which is to be ultimately obtained on the basis of the second air-fuel ratio control quantity C2 derived from the second air-fuel ratio signal V2 and the first target value VR1 for the first air-fuel ratio signal V1 becomes different in dependence on deviation or degradation of the output characteristic and the response time of the sensor employed as the first air-fuel ratio sensor 11. Thus, it is impossible to correct the air-fuel ratio control quantity in a satisfactory manner unless the operating or output characteristic of the first air-fuel ratio sensor 11 actually employed is taken into account and compensated for properly, as occasion requires.

Another problem of the air-fuel ratio control system known heretofore can be seen in conjunction with the second air-fuel ratio sensor 12 as well. Certainly, the second air-fuel ratio sensor 12 is low in the response speed when compared with that of the first air-fuel ratio sensor. However, since the temperature of the exhaust gas is low at the side downstream of the catalytic converter, the second air-fuel ratio sensor 12 is less susceptible to the influence of the heat. Besides, because the exhaust gas is purified by the catalytic converter, the second air-fuel ratio sensor 12 is scarcely exposed to the poisonous components contained in the exhaust gas. Furthermore, the exhaust gas is sufficiently mixed so that the oxygen concentration of the exhaust gas is held substantially equilibrium, as can be seen from the graph shown atop in FIG. 27. Thus, he second air-fuel ratio sensor can enjoy a stable output characteristic which is advantageous for compensating for deviations in the output characteristic of the first air-fuel ratio sensor.

However, since the air-fuel ratio feedback control is performed on the basis of the integral operation of the output of the second air-fuel ratio sensor, there arise problems such as a time lag in the air-fuel ratio control, overshoot correction of the air-fuel ratio and hence degradation in the cost-performance, exhaust gas emission characteristic and the drivability of the motor vehicle. Additionally, in the dual-sensor type air-fuel ratio control apparatus known heretofore, the amplitude of the first air-fuel ratio signal is not taken into consideration in the correction of the air-fuel ratio, incurring an improper air-fuel ratio feedback control, to another disadvantage.

Still another problem of the air-fuel ratio control system known heretofore is seen in that the function or performance of the catalytic converter 10 may significantly be degraded when it is exposed to unburned fuel upon occurrence of misfire or for other reason. In that case, the motor vehicle continues to run with the exhaust gas remaining scarcely purified by the catalytic converter, which in turn brings about change in the output characteristic of the second air-fuel ratio sensor 12 disposed downstream under the influence of the unburned fuel components such as HC, CO, $H_2$ and others. By way of example, the rate of change of the air-fuel ratio signal outputted from the downstream air-fuel ratio sensor may increase, incurring eventually significant degradation in the emission characteristic (i.e., exhaust gas purification performance).

For the above reason, it is important to detect functional degradation of the catalytic converter 10 and alarm the driver of this fact as soon as possible when the malfunction of the catalytic converter 10 is detected. In this conjunction, there is disclosed an apparatus for detecting degradation of a catalytic converter in Japanese Unexamined Patent Application No. 264312/1991 (JP-A-H3-264312) assigned to the assignee of the present application. In the case of this known apparatus, the air-fuel ratio signal of the air-fuel ratio sensor disposed downstream of the catalytic converter is compared with a reference level, wherein decision as to degradation of the catalytic converter is made on the basis of an integral value 6 of deviation of the air-fuel ratio signal of the downstream air-fuel ratio sensor, the number of times n the air-fuel ratio signal intersects the reference level, the period $\tau$ or a time interval ratio $\gamma = \tau_1 / \tau_2$ (where $\tau_1$ represents the period of the air-fuel ratio signal of the upstream sensor 11 with $\tau_2$ representing that of the downstream sensor 12 and others).

The catalyst degradation detecting technique known heretofore will be elucidated in more concrete by again referring to FIG. 24. The alarm lamp 19 for indicating occurrence of abnormality is driven upon detection of degradation in the performance of the catalytic converter 10. Further, the electronic control unit 20 incorporates a catalyst degradation decision means which generates the abnormality signal E indicative of degradation of the catalytic converter 10 upon detection of degradation thereof, for thereby lighting the alarm lamp 19.

Operation of the catalyst degradation decision means which can be implemented softwarewise will now be considered. FIG. 30 shows waveforms of the first and second air-fuel ratio signal V1 and V2 when the catalytic converter 10 operates normally, while FIG. 31 shows the same when the catalytic converter suffers abnormality. As can be seen from these figures, amplitude of the first air-fuel ratio signal V1 changes relative to the correction target quantity VT1 periodically at a proper time interval regardless of whether the catalytic converter 10 is normal or abnormal owing to the air-fuel ratio feedback control described hereinbefore.

On the other hand, the second air-fuel ratio signal V2 which remains substantially uniform owing to the purifying action of the catalytic converter 10 as mentioned previously and shown in FIG. 30 changes significantly in following the first air-fuel ratio signal V1 when the exhaust gas purifying capability of the catalytic converter 10 is lowered, as can clearly be seen by comparing FIG. 30 with FIG. 31. Thus, it is possible to detect abnormality or degradation of the catalytic converter 10 on the basis of the integral value $\delta$ (FIG. 31), the period $\tau$ of the second air-fuel ratio signal V2 or the number n of times the signal V2 intersects the second target value VR2 (this number will hereinafter be referred to also as the frequency).

Further, when the time interval ratio $\gamma (= \tau_1 / \tau_2)$ is employed as the degradation decision parameter, as mentioned previously, degradation of the catalytic converter 10 can be determined when the time interval ratio $\gamma$ exceeds a reference value $\gamma_0$ (about 50% of the maximum value).

In this regard, however, it should be recalled that the first air-fuel ratio sensor 11 disposed upstream of the catalytic converter 10 is susceptible to deterioration for the reasons described hereinbefore. Besides, dispersion in the operating characteristic of the sensors used as the first air-fuel ratio sensor 11 can not be avoided. As a consequence, there may arise the possibility that the second air-fuel ratio signal V2 is shifted to such extent that it can no more intersect the second target value VR2, as indicated by a dotted curve in FIG. 30, which means that neither the integral value $\delta$ nor the frequency n nor the period $\tau$ can no more be determined. In other words, when the output characteristic of the first air-fuel ratio signal V1 of the first air-fuel ratio sensor 11 changes, it may become impossible to detect degradation of the catalytic converter 10 on the basis of the output signal of the second air-fuel ratio sensor 12. Besides, since the air-fuel ratio signals V1 and V2 vary in dependence on changes in the operation state of the engine, involving changes in the values of $\delta$, $\tau$ and $\gamma$ as determined, which may lead to erroneous decision of degradation of the catalytic converter 10.

It can now be understood that the catalyst degradation detecting apparatus known heretofore suffers a drawback that the detection reliability is poor.

SUMMARY OF THE INVENTION

In the light of the state of the art described above, it is a general object of the present invention to solve the various problems described above of the air-fuel ratio control systems known heretofore.

Accordingly, it is a first object to provide a dual-sensor type air-fuel ratio control system for an internal combustion engine in which the air-fuel ratio control quantity can be protected against adverse influence even when the output characteristic and the response time of the first or upstream air-fuel ratio sensor are deviated or deteriorated.

A second object of the present invention is to provide a dual-sensor type air-fuel ratio control system in which the air-fuel ratio correcting quantity is controlled by determining a reference value for comparison with a first air-fuel ratio signal on the basis of a second air-fuel ratio signal to thereby protect the cost-performance, exhaust gas emission characteristic and the drivability against degradation.

In conjunction with the second object, it is also contemplated with the present invention to provide a dual-sensor type air-fuel ratio control system in which the value for comparison with the first air-fuel ratio signal is limited in dependence on the amplitude thereof to thereby ensure a more appropriate air-fuel ratio feedback control.

A third object of the present invention is to provide an air-fuel ratio control system of the type mentioned above which incorporates a facility for detecting degradation of a catalytic converter on the basis of output signals of the air-fuel ratio sensors with improved or enhanced reliability.

In view of the first object mentioned above, there is provided according to a first aspect of the present invention an air-fuel ratio control system for an internal combustion engine, which apparatus comprises a catalytic converter disposed within an exhaust pipe of the engine for purifying an exhaust gas, a first air-fuel ratio sensor disposed upstream of the catalytic converter for detecting concentration of a particular component of the exhaust gas to thereby output a first air-fuel ratio signal indicating the concentration, a second air-fuel ratio sensor disposed downstream of the catalytic converter for detecting concentration of the particular component of the exhaust gas to thereby output a second air-fuel ratio signal indicating the concentration of the particular gas component, and an electronic control unit for arithmetically determining an air-fuel ratio control quantity on the basis of the first and second air-fuel ratio signals. The electronic control unit includes a first arithmetic means for determining a first air-fuel ratio control quantity on the basis of the first air-fuel ratio signal, a second arithmetic means for determining a second air-fuel ratio control quantity on the basis of the second air-fuel ratio signal, a correcting means for correcting the first air-fuel ratio control quantify by the second air-fuel ratio control quantity to thereby determine as the air-fuel ratio control quantity the first air-fuel ratio control quantity as corrected, and a filtering processing means for filtering the first air-fuel ratio signal.

With the structure of the air-fuel ratio control system described above, the air-fuel ratio control can be performed on the basis of the first and the second air-fuel ratio signals in a satisfactory manner by virtue of such arrangement that the first air-fuel ratio control quantity is determined by filtering the first air-fuel ratio signal and that the first air-fuel ratio control quantity is corrected by the second air-fuel ratio control quantity which is derived on the basis of the second air-fuel ratio signal.

In a preferred mode for carrying out the invention, the filtering processing means is designed as to have a time constant in a range of 30 milliseconds to 100 milliseconds n the case where dispersion of response time of the first air-fuel ratio sensor ranges from 100 milliseconds to 1 second.

By selecting the time constant of the filtering means as mentioned above, dispersion or deviation in the output characteristic and the response time of the first air-fuel ratio sensor can effectively be compensated for.

In view of the second object mentioned previously, the present invention provides an air-fuel ratio control system for an internal combustion engine, which comprises a catalytic converter disposed within an exhaust pipe of the engine for purifying an exhaust gas, a first air-fuel ratio sensor disposed upstream of the catalytic converter for detecting concentration of a particular component of the exhaust gas to thereby generate a first air-fuel ratio signal indicating the concentration, a second air-fuel ratio sensor disposed downstream of the catalytic converter for detecting concentration of the particular component of the exhaust gas to thereby generate a second air-fuel ratio signal indicating the concentration, a deviation calculating means for arithmetically determining a deviation of the second air-fuel ratio signal from a first comparison value, a proportional value calculating means for arithmetically determining a proportional value which is proportional to the deviation determined by the deviation calculating means, an integrating means for calculating an integration value corresponding to the deviation, a comparison value calculating means for arithmetically determining a second comparison value on the basis of the integration value and the proportional value, a comparison means for comparing the second air-fuel ratio with the second comparison value, and an air-fuel ratio correcting means for increasing or decreasing an air-fuel ratio correcting quantity on the basis of the result of the output of the comparison means.

In the air-fuel ratio control system described above, the comparison value calculating means may be so implemented as to limits the second comparison value in dependence on an amplitude of the first air-fuel ratio signal, while the integrating means stops integral action during a period in which the second comparison value is limited.

With the above arrangement, the second problem mentioned hereinbefore can be solved satisfactorily.

The third object of the present invention can be accomplished by providing according to another aspect of the invention an apparatus for detecting deterioration of a catalytic converter disposed in an exhaust system of an internal combustion engine for purifying an exhaust gas of the engine, which apparatus comprises a first air-fuel ratio sensor disposed upstream of the catalytic converter for detecting concentration of a particular gas component of the exhaust gas to thereby produce a first air-fuel ratio signal indicating the concentration, a second air-fuel ratio sensor disposed downstream of the catalytic converter for detecting concentration of the particular gas component of the exhaust gas to thereby produce a second air-fuel ratio signal indicating the concentration, a deterioration decision means for determining deterioration of the catalytic converter on the basis of at least the second air-fuel ratio signal, an alarm means for generating an alarm when deterioration of the catalytic converter is determined, operation state detecting means for detecting operation state of the internal combustion engine, a filtering means for filtering the second air-fuel ratio signal to thereby derive a filtered air-fuel ratio signal, and a comparison means for comparing the second air-fuel ratio signal with the filtered air-fuel ratio signal. The deterioration decision means compares a deterioration parameter value derived from the result of the comparison with a predetermined value corresponding to the detected operation state of the engine to thereby determine deterioration of the catalytic converter when the deterioration parameter value exceeds the predetermined value.

Further, in view of the third object, there is provided according to yet another aspect of the invention an apparatus for detecting deterioration of a catalytic converter disposed in an exhaust system of an internal combustion engine for purifying an exhaust gas of said engine, which apparatus comprises a first air-fuel ratio sensor disposed upstream of the catalytic converter for detecting concentration of a particular gas component of the exhaust gas to thereby produce a first air-fuel ratio signal indicating the concentration, a second air-fuel ratio sensor disposed downstream of the catalytic converter for detecting concentration of the particular gas component of the exhaust gas to thereby produce a second air-fuel ratio signal indicating the concentration, a deterioration decision means for determining deterioration of the catalytic converter on the basis of at least the second air-fuel ratio signal, an alarm means for generating an alarm when deterioration of the catalytic converter is determined, an operation state detecting means for detecting operation state of the internal combustion engine, a filtering means for filtering the second air-fuel ratio signal to thereby derive a filtered air-fuel ratio signal, a first comparison means for comparing the second air-fuel ratio signal with the filtered air-fuel ratio signal for generating a first comparison result, a second comparison means for comparing the first air-fuel ratio signal with a target value for generating a second comparison result, and a third comparison means for comparing the first comparison result with the second comparison result each other to generate a third comparison result. The deterioration decision means compares a deterioration parameter value derived from the third comparison result with a predetermined value corresponding to the detected operation state of the engine to thereby determine deterioration of the catalytic converter when the deterioration parameter value exceeds the predetermined value.

In the catalyst deterioration diagnosis apparatuses described above, the comparison of the deterioration parameter value with the predetermined value may be performed when the operation state of the engine lies within a predetermined range. Further, the comparison of the deterioration decision means compares the deterioration parameter value may be performed with a predetermined value which varies in dependence on change in the operation state of the engine. The filter means may have a time constant lying within a range from 100 milliseconds to 300 milliseconds. The filtered signal may be imparted with such hysteresis which increases or decreases by a predetermined noise elimination factor which depends on magnitude of the second air-fuel ratio signal. The deterioration parameter value may be determined by integrating a difference between the second air-fuel ratio signal and the filtered air-fuel ratio signal. The aforementioned target value may have such hysteresis that increases or decreases by a predetermined noise elimination factor which depends on magnitude of the first air-fuel signal sensor.

Furthermore, with a view to achieving the third object, there is provided according to still another aspect of the invention an apparatus for detecting deterioration of a catalytic converter disposed in an exhaust system of an internal combustion engine for purifying an exhaust gas of the engine, which apparatus comprises a first air-fuel ratio sensor disposed upstream of the catalytic converter for detecting concentration of a particular gas component of the exhaust gas to thereby produce a first air-fuel ratio signal indicating the concentration, a second air-fuel ratio sensor disposed downstream of the catalytic converter for detecting concentration of the particular gas component of the exhaust gas to thereby produce a second air-fuel ratio signal indicating the concentration, a deterioration parameter determining means for determining a deterioration parameter value at every predetermined time interval on the basis of at least the second air-fuel ratio signal, a decision means for determining deterioration of the catalytic converter on the basis of the deterioration parameter value, an alarm means for generating an alarm when deterioration of the catalytic converter is determined, and a filtering means for filtering the deterioration parameter value to output a filtered deterioration parameter value. The decision means determines deterioration of the catalytic converter when the filtered parameter deterioration parameter value exceeds a predetermined value.

In the apparatus described above, the decision means may decide the deterioration of the catalytic converter when the filtered deterioration parameter value continues to exceed the predetermined value for a predetermined period. Further, the comparison between the filtered deterioration parameter value and the predetermined value may be performed when a difference between a currently sampled value of the filtered deterioration parameter value and a precedingly sampled value thereof exceeds a permissible upper limit value.

By virtue of the arrangements of the apparatuses described above, deterioration of the catalytic converter can be detected with remarkably enhanced reliability.

The above and other objects, features and attendant advantages of the present invention will more easily be understood by reading the following description of the preferred embodiments thereof taken, only by way of example, in conjunction with the drawings.

DESCRIPTION OF THE PREFERRED EMBODIMENTS

Now, the present invention will be described in detail in conjunction with preferred or exemplary embodiments thereof by reference to the drawings.

Embodiment 1

Figure 1:
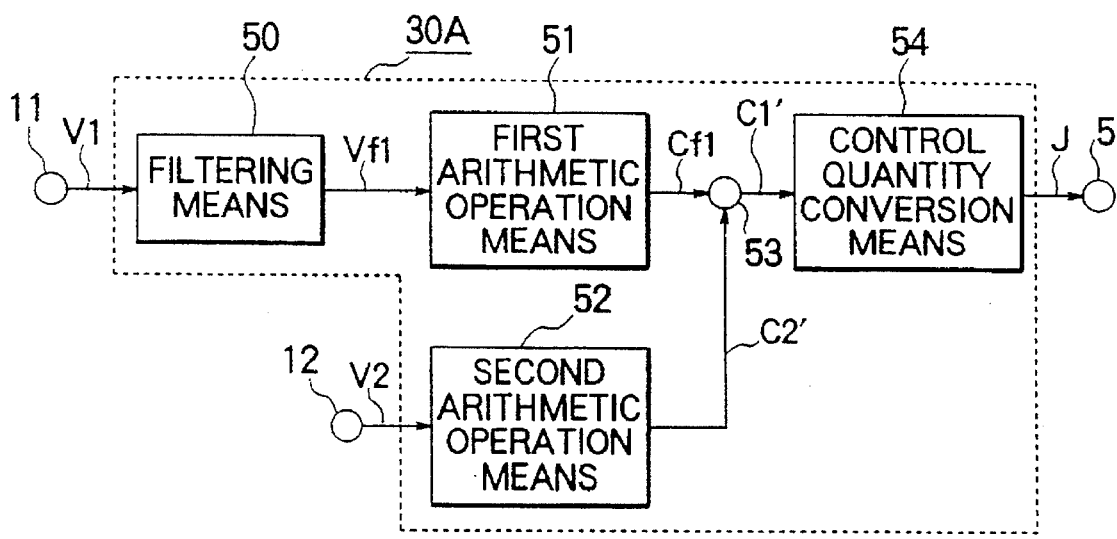
FIG. 1 is a functional block diagram showing an air-fuel feedback control operations of an air-fuel ratio control system for an internal combustion engine according to a first embodiment of the present invention.

FIG. 1 is a functional block diagram showing a general arrangement of the air-fuel ratio control system for an internal combustion engine of a first embodiment with which it is contemplated to achieve the first object of the invention according to the first aspect thereof mentioned hereinbefore. As can be seen in the figure, the air-fuel ratio control system is comprised of a microcomputer 30A which corresponds to the microcomputer 30 described hereinbefore by reference to FIG. 23. Further, in FIG. 1, reference numerals 5, 11 and 12 denotes the fuel injector, the first air-fuel ratio sensor and the second air-fuel ratio sensor, respectively, which were also described previously in conjunction with the related art. Moreover, the structures of the air-fuel ratio control system and the electronic control unit (ECU) are essentially same as those shown in FIGS. 24 and 25, respectively. Thus, repeated description thereof will be unnecessary.

Figure 28:
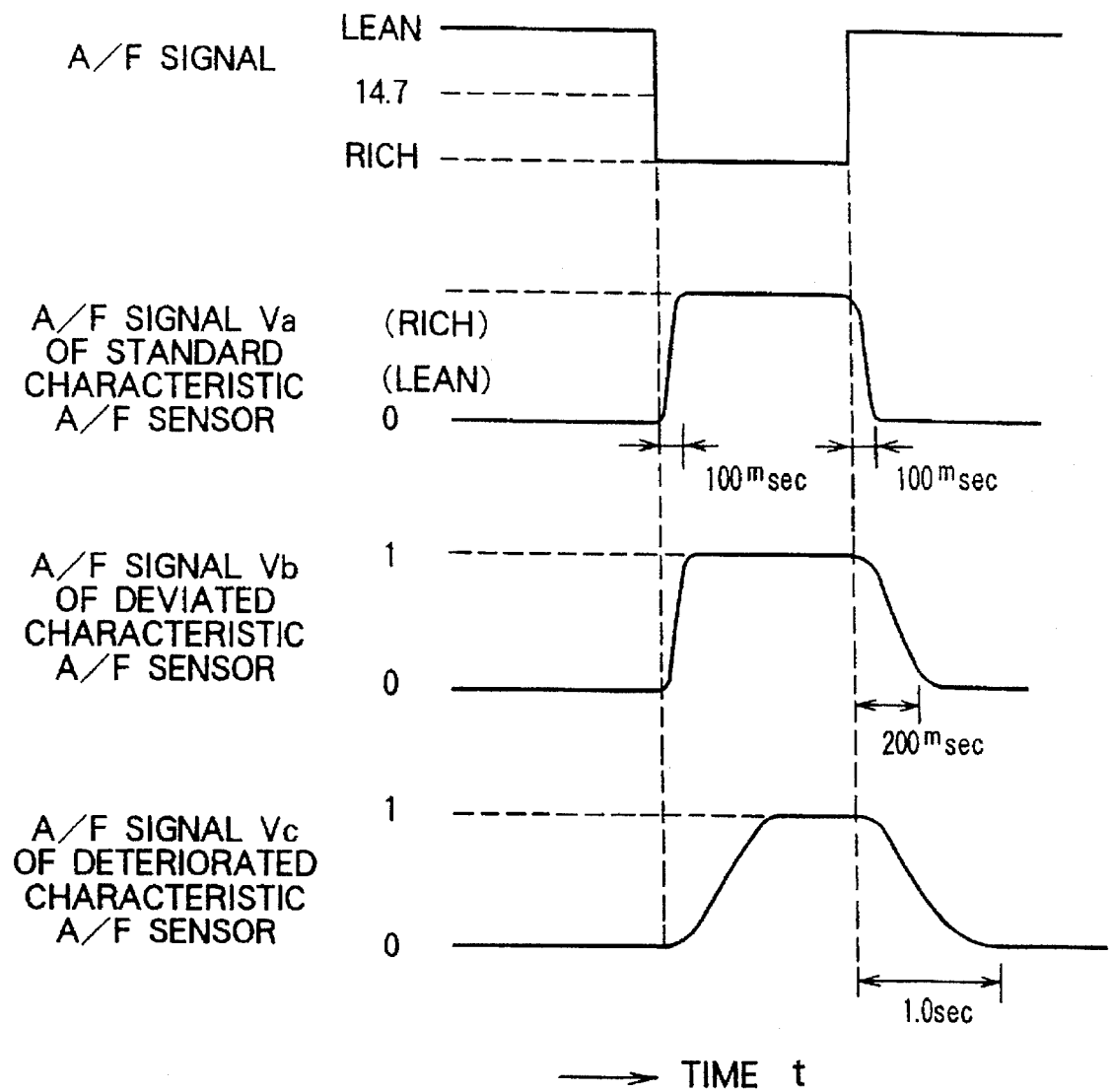
FIG. 28 is a timing chart for illustrating variations of output characteristics of an air-fuel ratio sensor disposed upstream of a catalytic converter in the system shown in FIG. 26.
Figure 29:
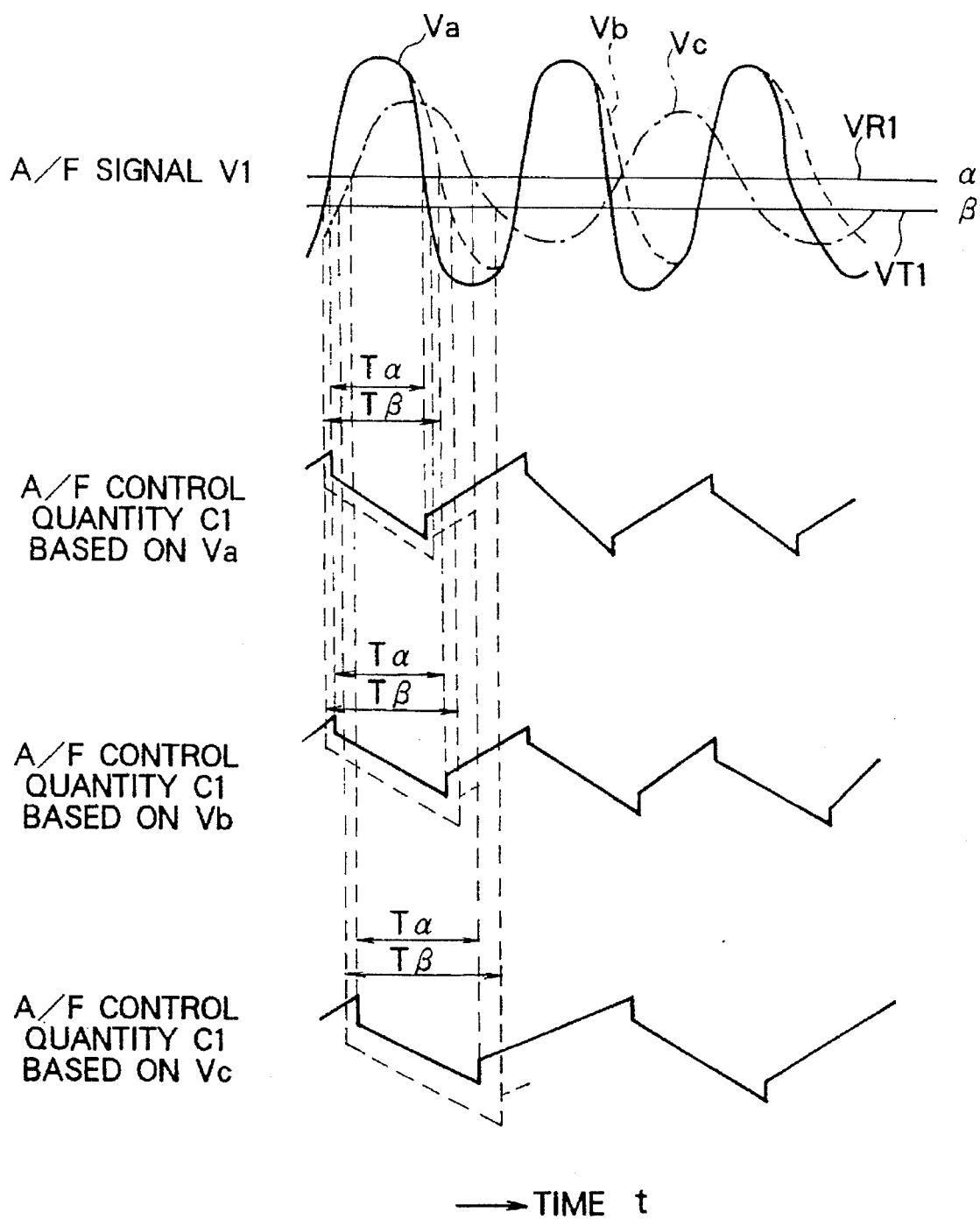
FIG. 29 is a timing chart for illustrating a problem ascribable to variations in the output characteristic of the above-mentioned sensor.
Figure 30:
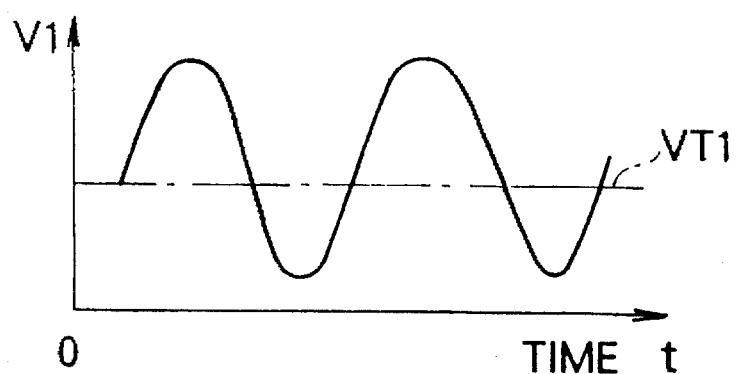
FIG. 30 is a waveform diagram of signals outputted by upstream and downstream sensors when a catalytic converter is normal.
Figure 30:
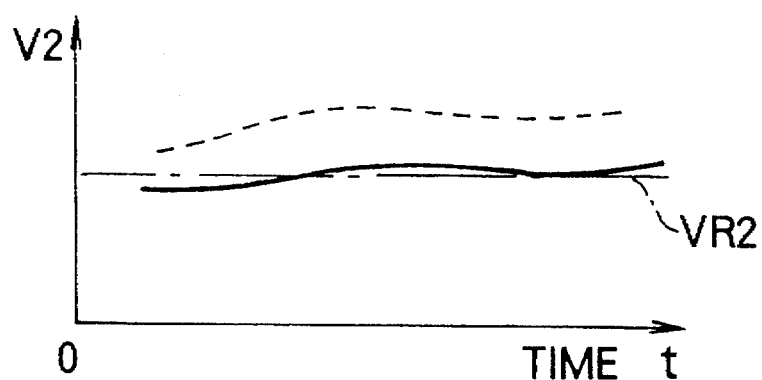

According to the teachings of the invention incarnated in this embodiment, there is additionally provided a filtering means 50 for filtering the first air-fuel ratio signal (A/F signal) V1 to thereby generate a filtered air-fuel ratio signal Vf1, wherein the time constant of the filtering means 50 is set in a range from 30 milliseconds to 100 milliseconds for the purpose of suppressing the variation or fluctuation in the response time which typically ranges from 100 milliseconds to 1 millisecond, as also described hereinbefore by reference to FIG. 28. In this conjunction, it should be mentioned that the time constant of a filtering means designed only for the purpose of noise elimination is usually on the order of several milliseconds.

The filtered air-fuel ratio signal Vf1 outputted from the filter means 50 is inputted to a first arithmetic operation means 51 which is adapted to determine arithmetically (i.e., calculate) a first air-fuel ratio control quantity Cf1 on the basis of the filtered air-fuel ratio signal Vf1. To this end, the first arithmetic means 51 is comprised of the subtractor 45 and the first PI controller 41 described hereinbefore by reference to FIG. 26. In the instant case, the subtractor 45 (FIG. 26) incorporated in the first arithmetic means 51 (FIG. 1) also performs comparison between the first air-fuel ratio signal V1 and the first target value VR1 in precedence to the control quantity correcting operation.

Figure 26:
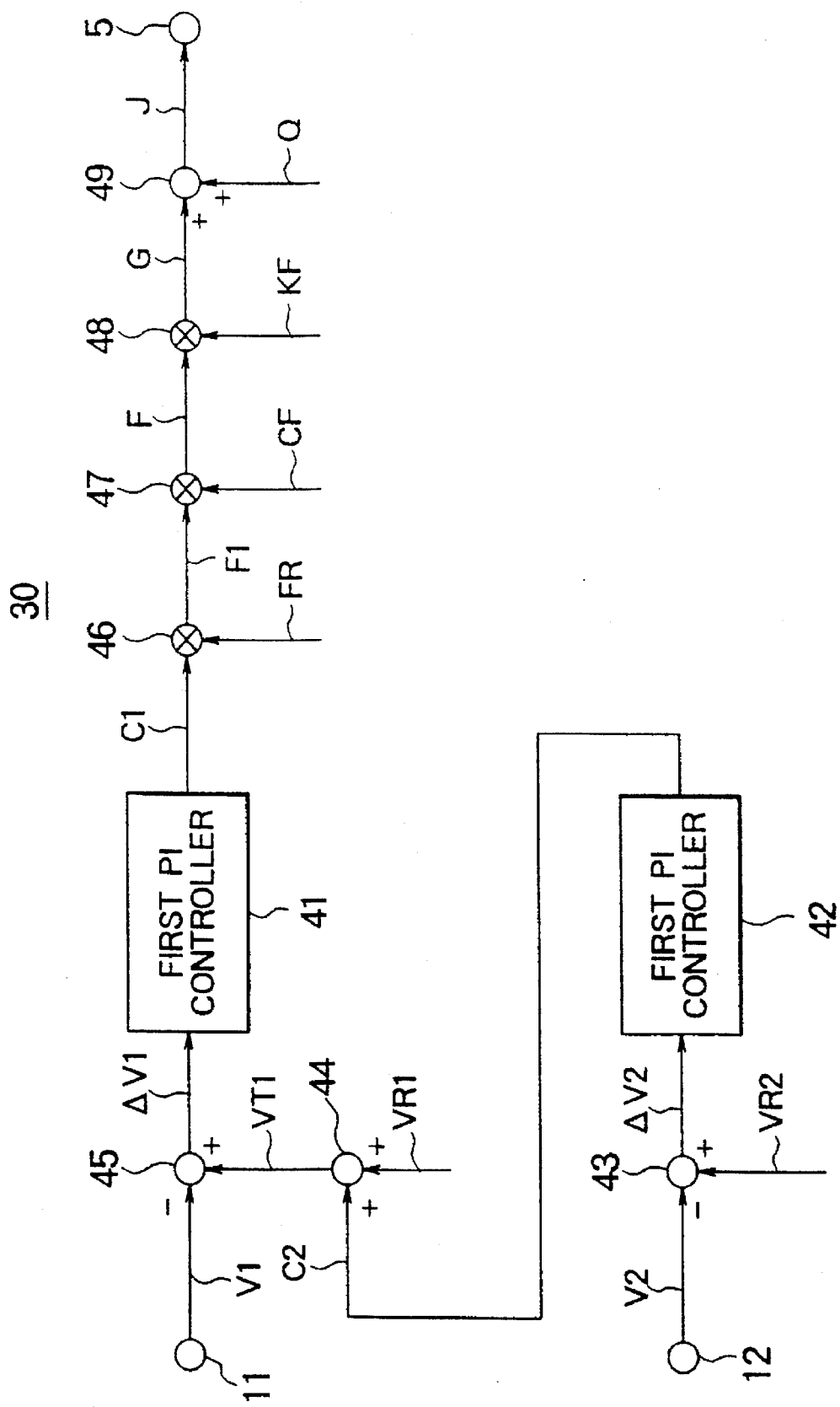
FIG. 26 is a schematic diagram for illustrating an arrangement of a dual-sensor type air-fuel ratio control system known heretofore.
Figure 27:
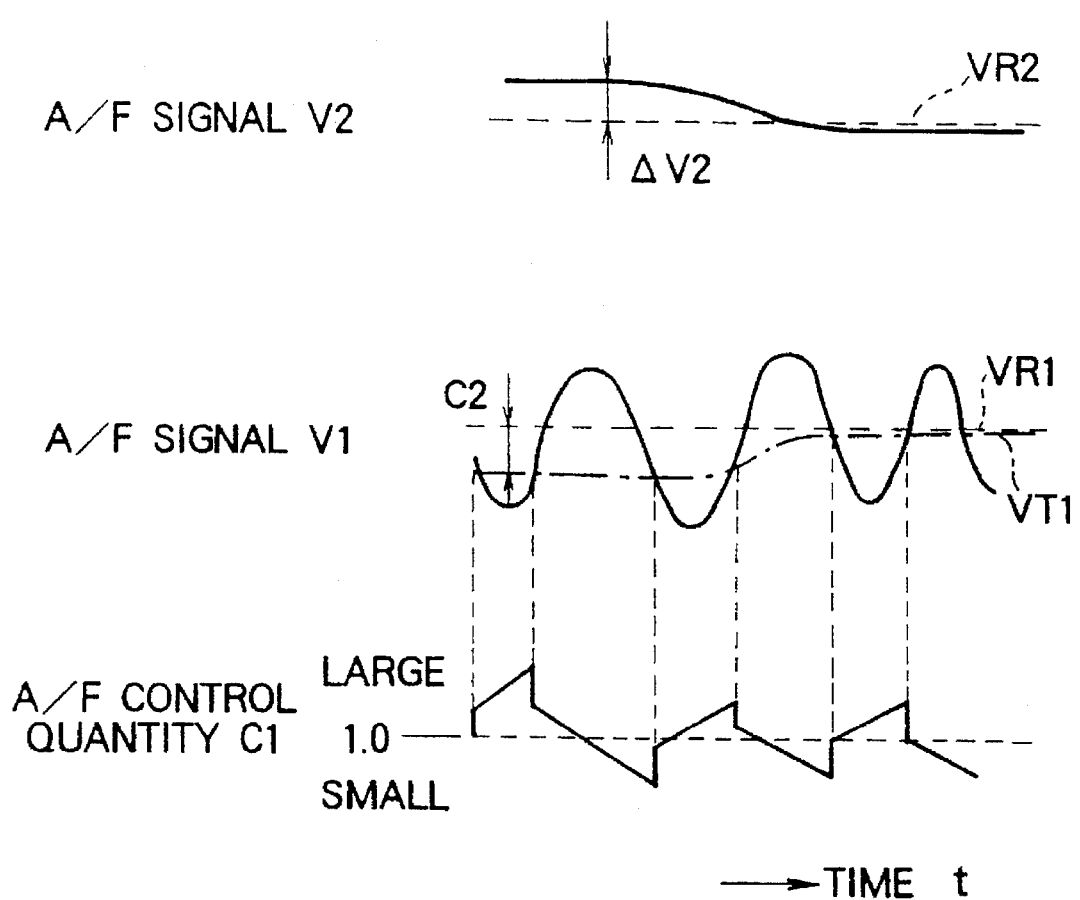
FIG. 27 is a waveform diagram illustrating air-fuel ratio signals are an air-fuel ratio control signal generated in the system shown in FIG. 26.

The second air-fuel ratio signal V2 outputted from the second air-fuel ratio sensor 12 is supplied to a second arithmetic means 52 which is adapted to determine arithmetically a second air-fuel ratio control quantity (correcting quantity) C2' on the basis of the second air-fuel ratio signal V2 outputted from the second sensor 12 and which is comprised of the subtractor 43 and the second PI controller 42, as described hereinbefore by reference to FIG. 26. In the case of the instant embodiment, however, the second air-fuel ratio control quantity C2' does not serve as the correcting quantity for the first target value (see FIG. 26) VR1 but serves as the correcting quantity for the first air-fuel ratio control quantity Cf1. Accordingly, the control quantity inputted to the second PI controller 42 necessarily differs from that mentioned previously.

The first air-fuel ratio control quantity Cf1 is added with the second air-fuel ratio control quantity C2' to undergo correction thereby, as a result of which an aimed air-fuel ratio control quantity C1' is finally obtained.

The aimed air-fuel ratio control quantity C1' thus obtained is converted into the fuel injection control signal J controlling for the fuel injector 5 via the control quantity converting means 54 which is constituted by the multipliers 46 to 48 and the adder 49 shown in FIG. 26. The filter means 50 the first and second arithmetic means 51 and 52 and conversion means 54 may be implemented softwarewise.

Figure 25:
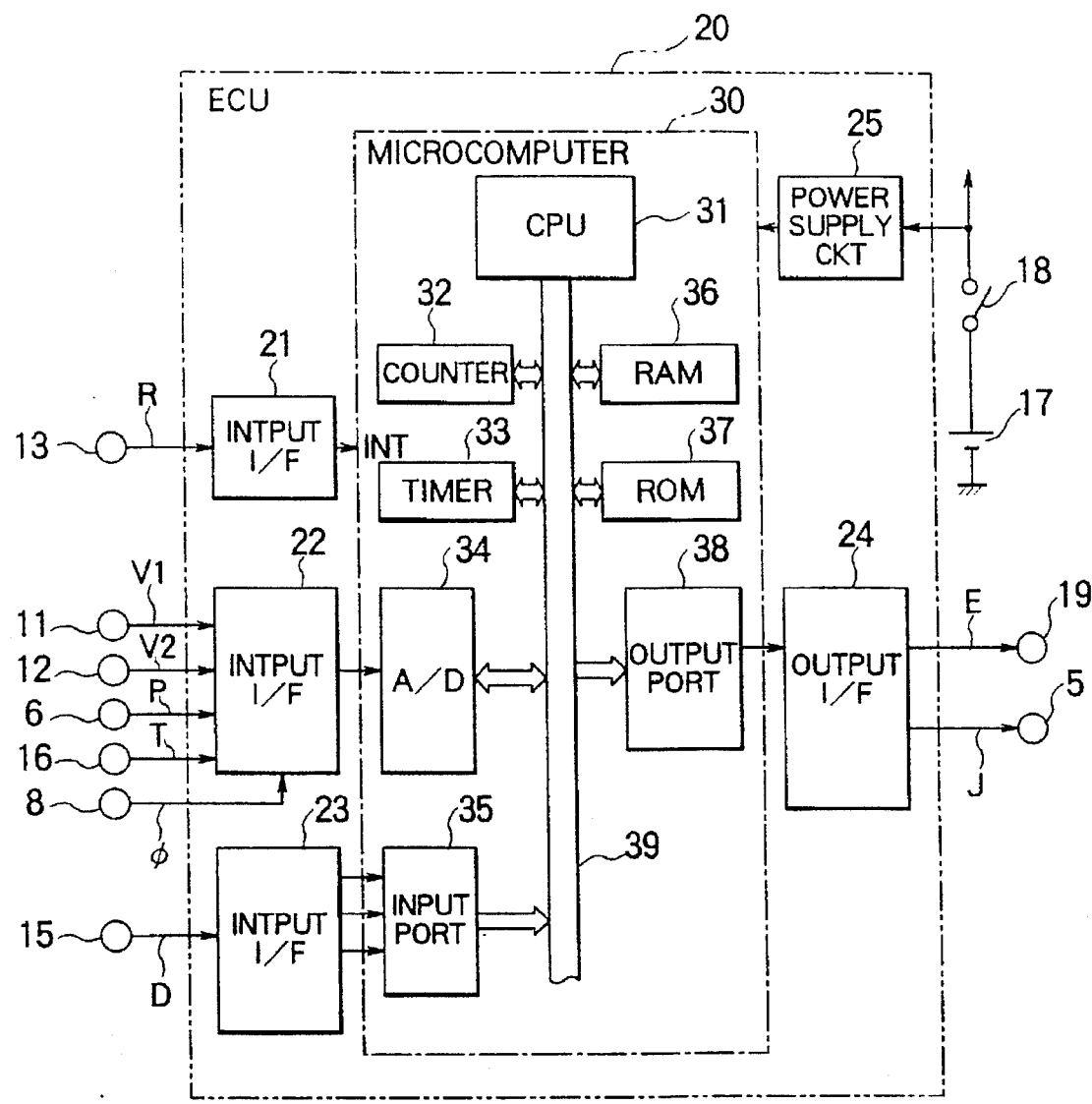
FIG. 25 is a block diagram showing a configuration of an electronic control unit employed in the system of FIG. 24.

Next, description will be made of operation of the air-fuel ratio control system according to the instant embodiment by referring to FIG. 1 together with a flow chart of FIG. 2 and a waveform diagram of FIG. 3. In this regard, it is assumed that the filtering routine shown in FIG. 2 is executed periodically at a time interval of, for example, 10 milliseconds in response to an interruption signal derived from the signal R (FIG. 25).

Figure 2:
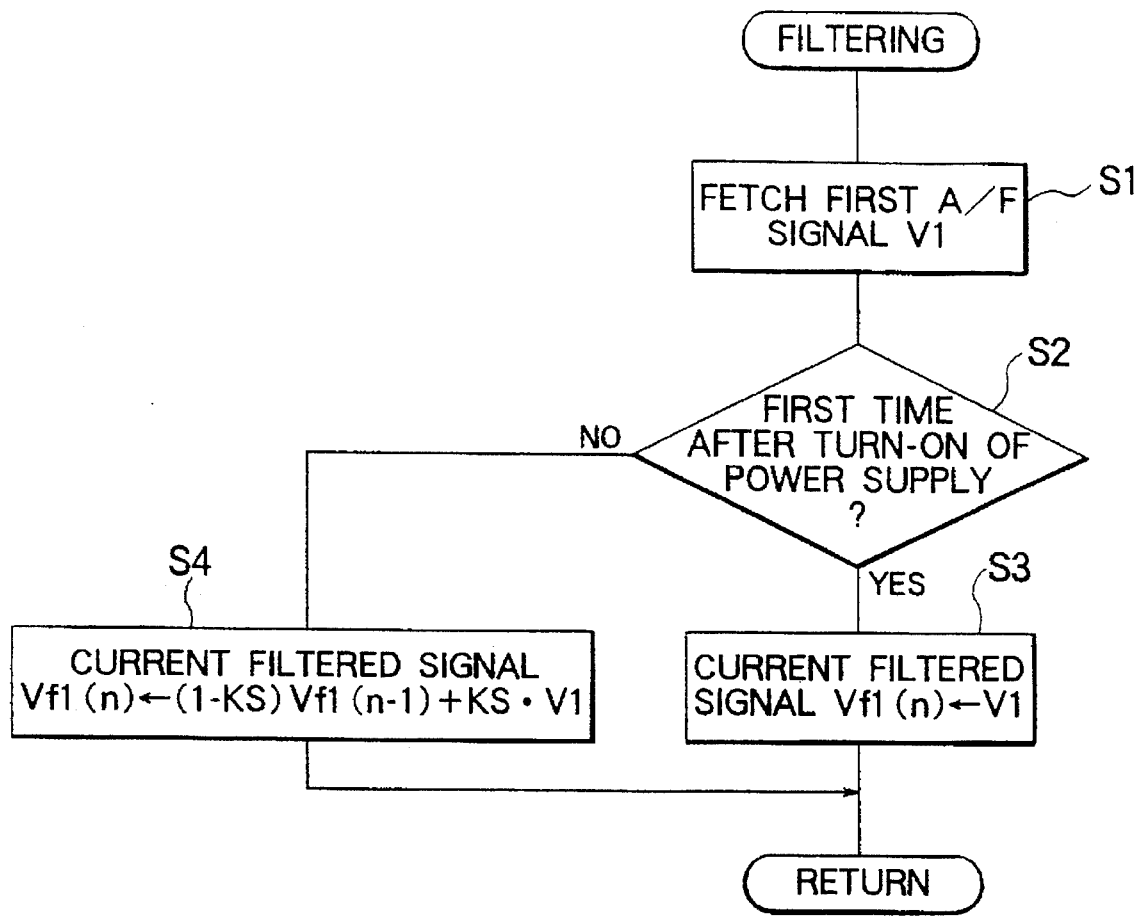
FIG. 2 is a flow chart for illustrating operations of a filtering routine performed by the system.

Referring to FIG. 2, the first air-fuel ratio signal V1 is fetched from the output of the first air-fuel ratio sensor 11 in a step S1, which is then followed by a step S2 where decision is made as to whether the fetching or reading of the first air-fuel ratio signal V1 is the first time after the turn-on of the power supply. If the answer of this decision step S2 is affirmative (YES), the first air-fuel ratio signal V1 is set as the initial value for the filtered air-fuel ratio signal Vf1(n) in a step S3 and registered in place of the last filtered air-fuel ratio signal Vf1(n−1), whereupon this filtering routine comes to an end (RETURN).

On the other hand, when the decision step S2 results in negation (NO), a step S4 is executed, whereby the current air-fuel ratio signal V1 undergoes a linear filtering operation which can be given by the following expression (1):

$$Vf1(n) = (1-Ks) \times Vf1(n-1) + Ks \times V1 \quad (1)$$

where Vf1(n) represents the currently obtained air-fuel ratio signal through the filtering operation, and Ks represents a filtering coefficient which is set within a range of 0<Ks<1. As is apparent from the above expression (1), the first air-fuel ratio signal V1 is converted to the filtered air-fuel ratio signal Vf1 with a delay in the response time corresponding to a time constant of the filtering means 50 which ranges from 30 milliseconds to 100 milliseconds, as mentioned previously. The filtered air-fuel ratio signal Vf1 is then inputted to the first arithmetic operation means 51 (FIG. 1). At that time, the waveform of the filtered air-fuel ratio signal Vf1 is so deformed as to have a response time which is increased by the time constant of the filtering means 50 and which is sufficiently long to suppress deviation or variation of the first air-fuel ratio signal V1 from that of a sensor selected as the standard.

Figure 3:
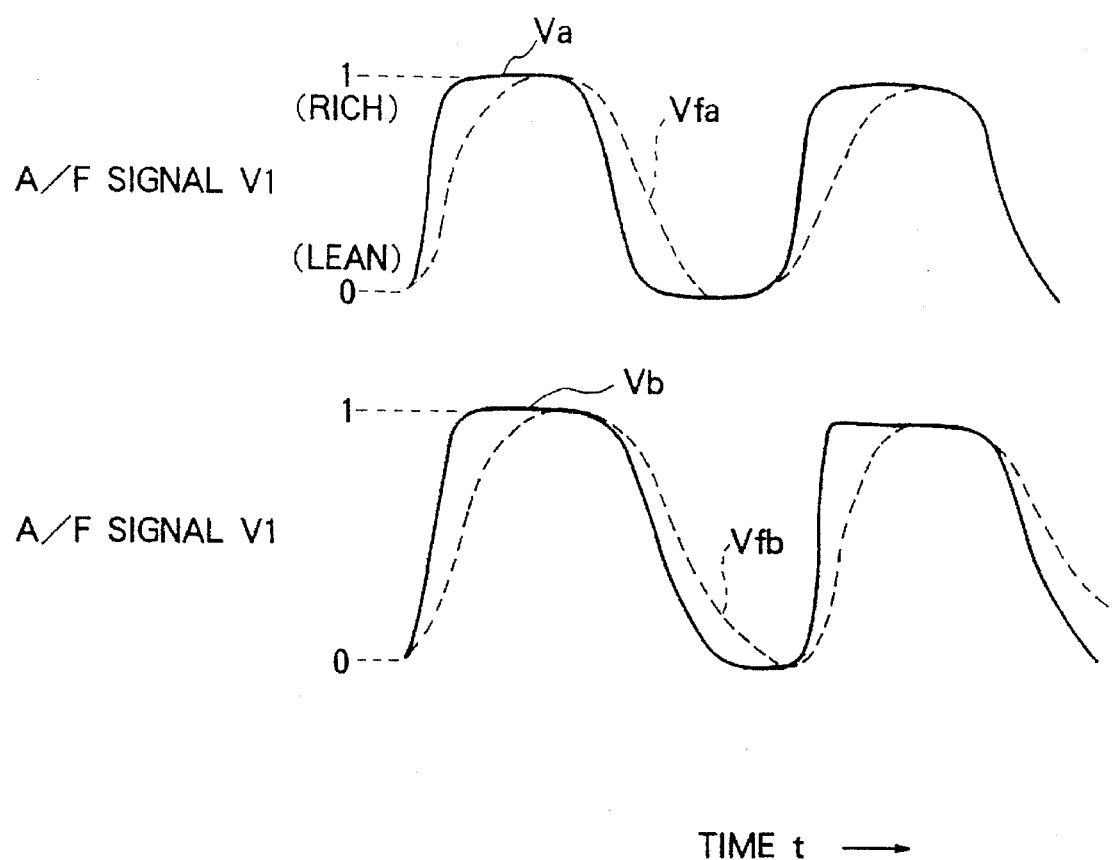
FIG. 3 is a waveform diagram for illustrating air-fuel ratio signals outputted from air-fuel ratio sensors having a standard output characteristic and a deviated characteristic, respectively, together with respective filtered air-fuel ratio signals.

FIG. 3 is a waveform diagram for illustrating the first air-fuel ratio signal V1 (in solid line curves) outputted from the air-fuel ratio sensors having, respectively, a standard output characteristic Va and a characteristic Vb deviated therefrom together with respective filtered air-fuel ratio signals Vfa and Vfb (both in dotted line curves) outputted from the filtering means 50. As can be seen from FIG. 3, there exists substantially no difference in the response time between the filtered air-fuel ratio signals Vfa and Vfb nevertheless of the presence of significant difference in the response time between the original air-fuel ratio signals (Va) and (Vb).

As will now be understood from the foregoing description, by applying the filtering processing to the first air-fuel ratio signal V1, deviations in the output characteristic and the response time of the first air-fuel ratio sensor 11 can be compensated for. Accordingly, the aimed air-fuel ratio control quantity C1' corrected by the second air-fuel ratio control quantity C2' is substantially immune to the influence of the deviations and/or deterioration of the output characteristic and the response time of the first air-fuel ratio sensor 11, whereby the correct or proper air-fuel ratio control can be accomplished by the fuel injection control which is based on the control signal J obtained from the signal C1 via the aforementioned conversion means.

Parenthetically, the second air-fuel ratio sensor 12 which is disposed downstream from the catalytic converter 10 is inherently less susceptible to the deterioration brought about by exposure to the unprocessed exhaust gas components and exhaust gas temperature, as mentioned hereinbefore. Accordingly, deviations in the output characteristic and the response time of the second air-fuel ratio sensor 12 may be put aside from consideration.

Embodiment 2

This embodiment is a version of the first embodiment described above. In the case of the first embodiment of the invention, the first air-fuel ratio control quantity Cf1 is corrected by adding thereto the second air-fuel ratio control quantity C2'. In the air-fuel ratio control system according to the instant embodiment, the first target value VR1 by using the second air-fuel ratio control quantity C2 described hereinbefore in conjunction with FIG. 26. In this regard, it should be noted that so far as the aimed air-fuel ratio control quantity C1' can be corrected, other correcting methods such as correction of P and/or I-value of the first PI controller 41, the delay time as involved in the processing by the first PI controller 41 and the like can be utilized.

Figure 4:
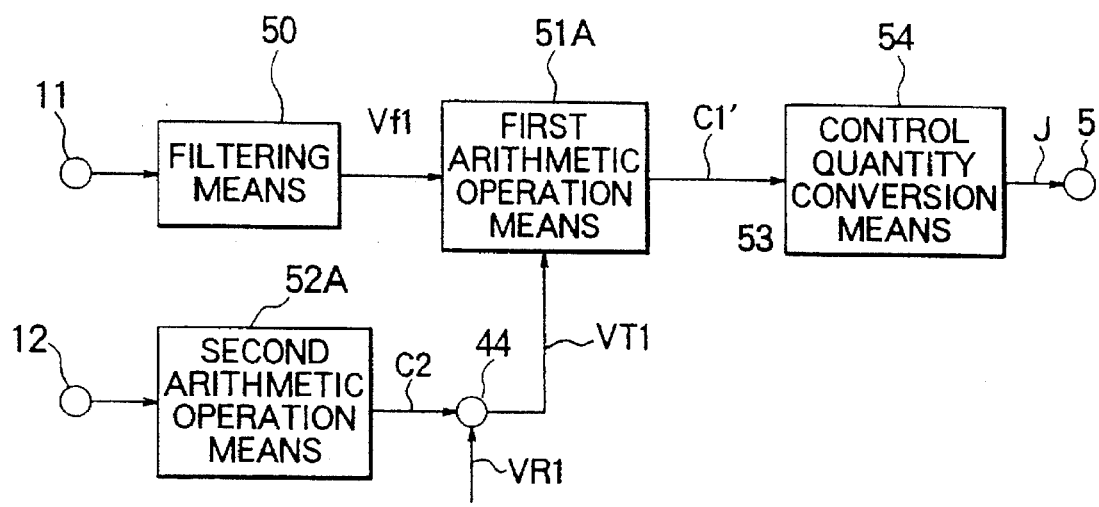
FIG. 4 is a block diagram showing a functional configuration of an air-fuel ratio control system according to a second embodiment of the present invention.

FIG. 4 is a block diagram showing a functional configuration of the air-fuel ratio control system according to the second embodiment which is so arranged as to correct the first target value VR1 by the second air-fuel ratio control quantity C2. In the figure, reference numerals 5, 11, 12, 44, 50 and 54 denote the components which are the same as or equivalent to those mentioned hereinbefore by using the like reference numerals in FIGS. 1 and 26. Accordingly, repeated description of these components will be unnecessary. Further, arithmetic operation means 51A and 52A shown in FIG. 4 correspond, respectively, to the first and second arithmetic operation means 51 and 52 shown in FIG. 1 and differ from the latter in that the first arithmetic operation means 51A includes the subtractor 45 (FIG. 26) for comparing the filtered air-fuel ratio signal Vf1 with the correction target quantity VT1 and the first PI controller 41, while the second arithmetic operation means 52A is comprised of the subtractor 43 and the second PI controller 42 (shown in FIG. 26).

Since operation of the air-fuel ratio control system according to the second embodiment is self-explanatory from the description of the first embodiment, repetition thereof will be unnecessary. It should however be mentioned that the substantially same advantage as that of the first embodiment can be obtained.

Embodiment 3

Next, description will be made of a third embodiment of the air-fuel ratio control system according to the second aspect of the invention with which it is contemplated to achieve the second object mentioned hereinbefore. More specifically, since the air-fuel ratio feedback control is performed on the basis of the integral action of the PI controller on the of the output of the second air-fuel ratio sensor 12, there arise problems such as a time lag or delay in the air-fuel ratio control, overshoot correction of the air-fuel ratio and eventually degradation in the cost-performance, exhaust gas emission characteristic and the drivability of the motor vehicle. Additionally, in the dual-sensor type air-fuel ratio control apparatus known heretofore, the amplitude of the first air-fuel ratio signal is not taken into consideration in the correction of the air-fuel ratio, incurring an improper air-fuel ratio feedback control, to another disadvantage. With the instant embodiment of the invention, it is intended to solve these problems.

Figure 5:
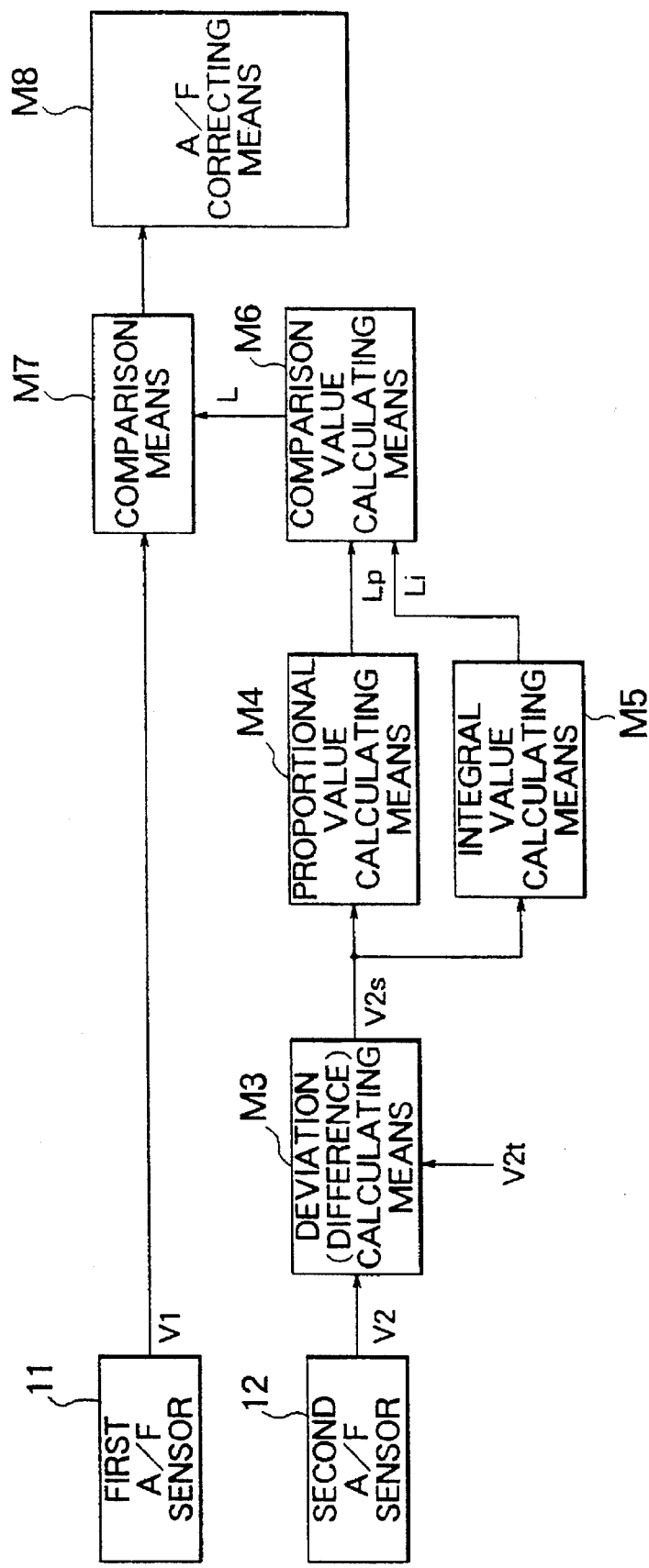
FIG. 5 is a block diagram showing a general arrangement of the air-fuel ratio control system for an internal combustion engine according to a third embodiment of the invention.

FIG. 5 is a functional block diagram showing a general arrangement of the air-fuel ratio control system according to the third embodiment. In the figure, reference numerals 11 and 12 denote first and second air-fuel ratio sensors, respectively, which serve for the same functions described hereinbefore.

According to the invention incarnated in the third embodiment, there is provided a deviation calculating means M3 which is designed to determine a difference (or deviation) V2S between the output V2 of the second air-fuel ratio sensor 12 and a stoichiometrically optimal output V2t thereof (e.g., output of the second air-fuel ratio sensor 12 when the catalytic purification efficiency is at maximum) or correction. The optimal output V2t thus serves as a first value for comparison. The difference or deviation V2S outputted from the deviation calculating means MS is supplied to a proportional value calculating means M4 for obtaining a value proportional to the deviation V2S. To this end, the proportional value calculating means M4 may be so configured as to multiply the deviation V2S with a proportional factor, to thereby output a deviation proportional value Lp. Further, the deviation V2S is supplied to n arithmetic integration means M5 which determines an integration gain KIR corresponding to the deviation V2S so far as the latter does not lie in a blind zone, to thereby determine an integration value Li of the deviation V2S by using an integral value KIR mentioned hereinafter. The integration value Li and the proportional value LP are inputted to a comparison value calculating means M6 which calculates on the basis of the input values Lp and Li a second reference or comparison value L for effecting the comparison with the first air-fuel ratio V1 outputted from the first air-fuel ratio sensor 11 by a comparison means M7 whose output signal is supplied to an air-fuel ratio correcting means M8 which serves to increase or decrease an air-fuel ratio correcting quantity on the basis of the result of comparison performed by the comparison means M7 for controlling the air-fuel ratio control quantity. At this juncture, it should be mentioned that the comparison value calculating means M6 is additionally imparted with a function for limiting the second comparison value L in dependence on the amplitude of the first air fuel-ratio signal V1 , i.e., amplitude between the maximum and minimum level thereof. During the period for which the second comparison value L is limited, the operation of the integral value calculating means M5 is inhibited. The means M3, M4, M5, M6, M7 and M8 may be incorporated in the electronic control unit 20 shown in FIG. 24 and implemented softwarewise so as to be realized by the microcomputer 30 shown in FIG. 25. Parenthetically, a reference numeral 40 in FIG. 24 denotes a vehicle speed sensor mounted in association with an axle of the motor vehicle for generating a pulse signal of a frequency proportional to the rotation speed of the axle. Further, the electronic control unit 20 is implemented in such a configuration as shown in FIG. 26.

Next, operation of the air-fuel ratio control system according to the instant embodiment will be elucidated below.

Figure 6:
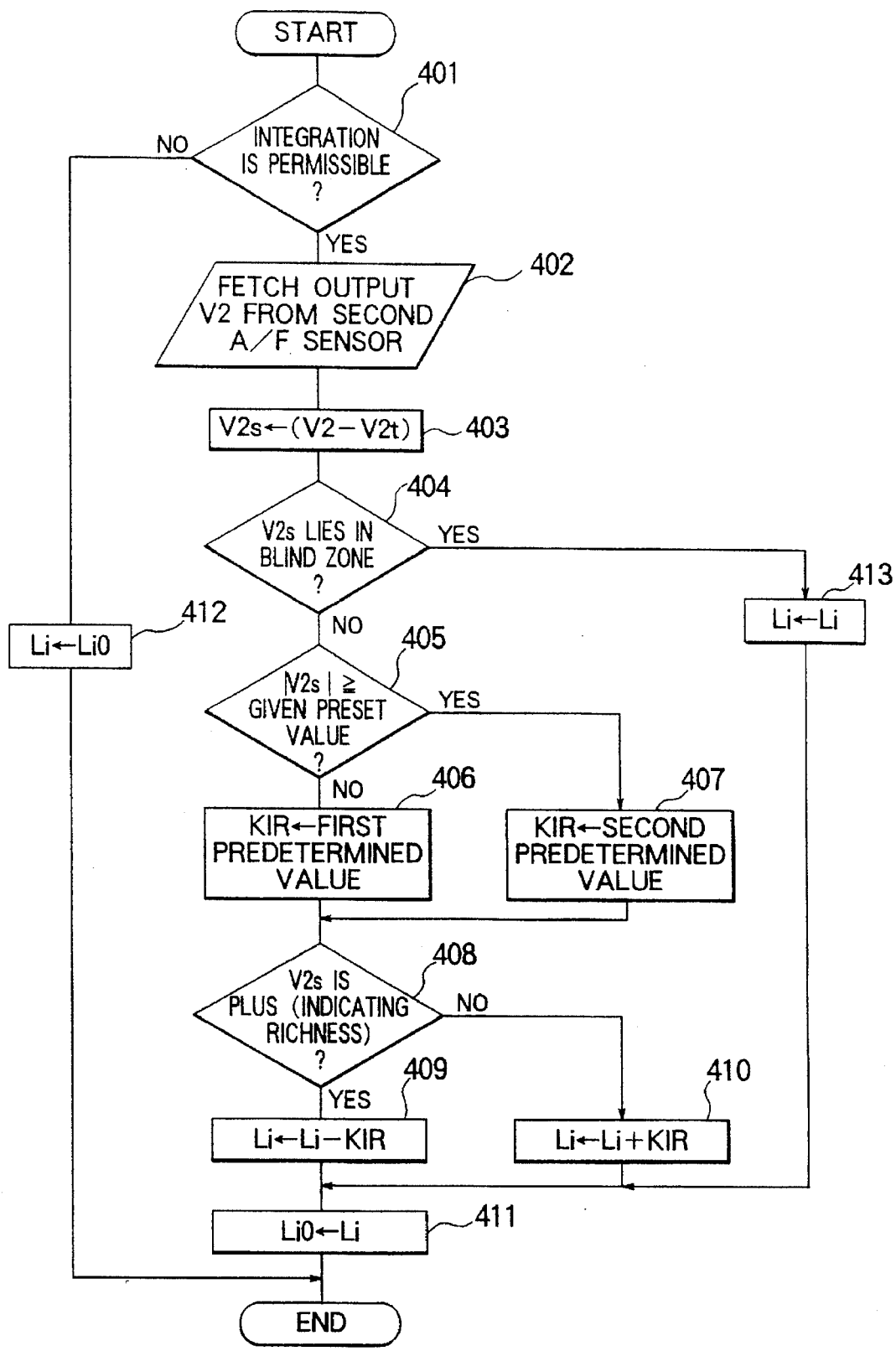
FIG. 6 is a flow chart for illustrating a processing executed by deviation calculating means and an integral calculating means of the system shown in FIG. 5.

FIG. 6 shows a flow chart for illustrating a processing corresponding to the functions of the deviation calculating means M3 and the integral value calculating means M5.

The integration routine is executed by taking into account the charging efficiency or the intake air flow of the engine. Thus, this routine can be executed every time the interrupt signal is inputted from the ignition system 13.

In a step 401, it is decided whether or not the integral action or operation is permissible, i.e., whether the air-fuel ratio feedback control based on the output signal of the second air-fuel ratio sensor 12 can be effected. This decision can be realized by checking whether the feedback control conditions for the first air-fuel ratio sensor 11 are satisfied and whether the second comparison value L is to be limited. Of course, this integral action or operation is always inhibited when the engine is in the transient state.

When it is decided in the step 401 that the integral operation is not permissible, the integration value LiO determined in the immediately preceding routine is set as the current integration value, whereupon the current integration routine comes to an end. Alternatively, an integral value determined and stored on the basis of the data for the learning of the electronic control unit may be set as the value Li.

On the other hand, when the decision step 401 results in affirmation (YES), the second air-fuel ratio signal V2 of the second air-fuel ratio sensor 12 is fetched in a step 402 and compared with an optimal or ideal air-fuel ratio V2t of the second air-fuel ratio sensor 12 serving as the reference value for the comparison, to thereby determine the difference V2S (=V2S−V2t) in a step 403. In this regard, the phrase "optimal or ideal output" represents the output of the second air-fuel ratio sensor 12 obtained experimentally when the catalytic purification efficiency is at maximum. By way of example, the ideal output of the second air-fuel ratio sensor 12 may have a voltage of 0.55 V.

Next, in a step 404, it is checked where the difference or deviation V2S determined in the step 403 lies in a blind zone, i.e., whether the value V2S assumes a value not to be integrated. More specifically, it is checked whether the output V2S is lower than 0.03 V in amplitude.

When the answer of the step 404 is affirmative (YES), the integration value Li mentioned above is selected (step 413) and set as the current integration value LiO (step 411). In other words, the integration value determined through the immediately preceding routine is held as the current integration value LiO.

On the other hand, when it is decided in the step 404 that the deviation V2S is not in the blind or dead zone, it is then checked whether the absolute value of the deviation V2S is greater than a given preset value (e.g., 0.2 V) in a step 405. When this decision step 405 results in negation (NO), a first predetermined value is selected as the integral gain KIR in a step 406. On the contrary, when the answer of the step 404 is affirmative, a second predetermined value is set as the integral gain KIR (step 407). In this conjunction, the second predetermined value is selected greater than the first predetermined value. In this manner, the integral gain KIR can be set when the deviation V2S is greater than the given predetermined value.

In a step 408, it is decided whether or not the deviation V2S assumes a positive (+) value. In other words, it is decided whether the air-fuel ratio of the exhaust gas detected by the sensor 12 downstream of the catalytic converter 10 is higher than the aforementioned optimal output V2t. When the deviation V2S is positive, this indicates that the fuel is in excess or rich. Accordingly, the integration value Li is subtracted by the integral gain KIR in a step 409, while the integration value Li is added with the integral gain KIR when the value of the deviation V2S is negative or minus in a step 410.

In this manner, in the processing step 409, the second reference value L for the comparison with the air-fuel ratio V1 of the first air-fuel ratio sensor 11 is decreased when the output V2 of the second air-fuel ratio sensor 12 is higher than the ideal value. By executing repeatedly this routine, the integration value Li is progressively decremented by the integral gain KIR.

On the other hand, when the output V2 of the second air-fuel ratio sensor 12 is lower than the ideal output, the value L for comparison with the output V1 of the first air-fuel ratio sensor 11 is progressively incremented by the integral gain KIR as this routine is executed repeatedly.

The integration value Li finally obtained in the step 409 or 410 is set as the updated integration value LiO to be held (step 411), whereupon this routine comes to an end.

It should however be mentioned that the updated integration value LiO obtained in the step 411 may be a mean value of the receding integration value LiO and the current integration value Li or alternatively a mean value of three or more successive integrated values. Alternatively, the integration value LiO may be a constant value or value learned by the electronic control unit in a predetermined engine operation state (e.g., a value determined when the throttle opening degree, the intake air flow, the intake air pressure, engine speed, the vehicle speed and/or the output V2 of the second air-fuel ratio sensor 12 falls within the respective predetermined range.

Figure 7:
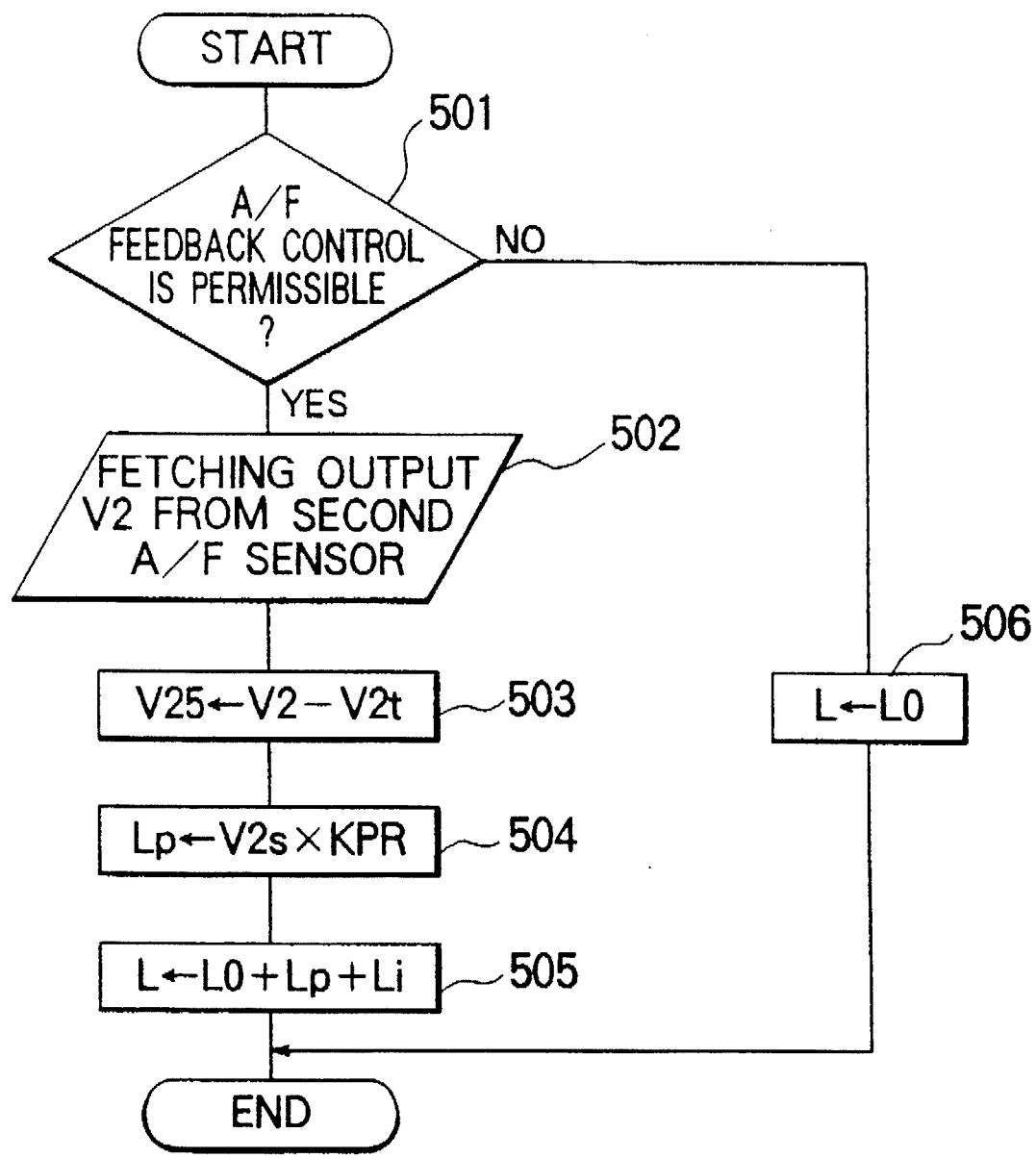
FIG. 7 is a flow chart for illustrating a comparison value determination processing executed by a deviation calculation means, a proportional value calculating means and a comparison value calculating means of the system shown in FIG. 5.

Next, referring to FIG. 7, description will turn to the comparison value determining routine for calculating the second value L to be compared with the output V1 of the first air-fuel ratio sensor 11.

FIG. 7 is a flow chart for illustrating a comparison value determining routine corresponding to the function of the deviation calculating means M3, the proportional value calculating means M4 and the comparison value calculating means M6.

This comparison value determining routine is executed in dependence on the engine charging efficiency or the intake air flow and may be activated in response to the input of the interrupt signal generated by the igniter system 13, as is in the case of the integrated value determining routine shown in FIG. II-4.

First, in a step 501, it is checked whether or not the comparison value determining operation is permissible, i.e., whether or not the air-fuel ratio feedback control based on the output of the second air-fuel ratio sensor 12 is permissible. When the engine is currently being started or when the fuel is being increased after the start or for the purpose of warming the engine or when the second air-fuel ratio sensor 12 is not activated yet, the air-fuel ratio feedback control is inhibited. Decision as to whether the second air-fuel ratio sensor 12 is activated or not may be made on the basis of the output signal of the water temperature sensor 16 (FIG. 5). More specifically, when the output signal of the water temperature sensor 16 is higher than a predetermined value, it can be decided that the second air-fuel ratio sensor 12 is in the activated state. Alternatively, this decision may be made by checking change in the output level of the second air-fuel ratio sensor 12.

When it is decided in the step 501 that the engine state does not permit the air-fuel ratio feedback control, a predetermined value LO (e.g., 0.45 V) is set as the comparison value L, whereupon this routine comes to an end (steps 501, 506).

On the other hand, when it is decided in the step 501 that the air-fuel ratio feedback control is permissible, the output of the second air-fuel ratio sensor 12 is fetched (step 502), and a deviation or difference V2S (=V2−V2t) between the output value V2 of the second air-fuel ratio sensor 12 and the ideal value V2t thereof is calculated in a step 503.

Subsequently, the proportional value Lp is determined as a product of the above-mentioned deviation V2S and the proportional gain KPR in a step 504, whereupon the comparison value L is determined as a sum of the integration value Li obtained through the integral routine shown in FIG. 6 the proportional value Lp obtained in the step 504 and the predetermined value LO are added to the integration value Li in a step 505. Then, the comparison value determining routine then comes to an end.

Next, description will be directed to an air-fuel ratio correcting routine for correcting the air-fuel ratio on the basis of the output V1 of the first air-fuel ratio sensor 11 and the comparison value L obtained through the routine shown in FIG. 7.

Figure 8:
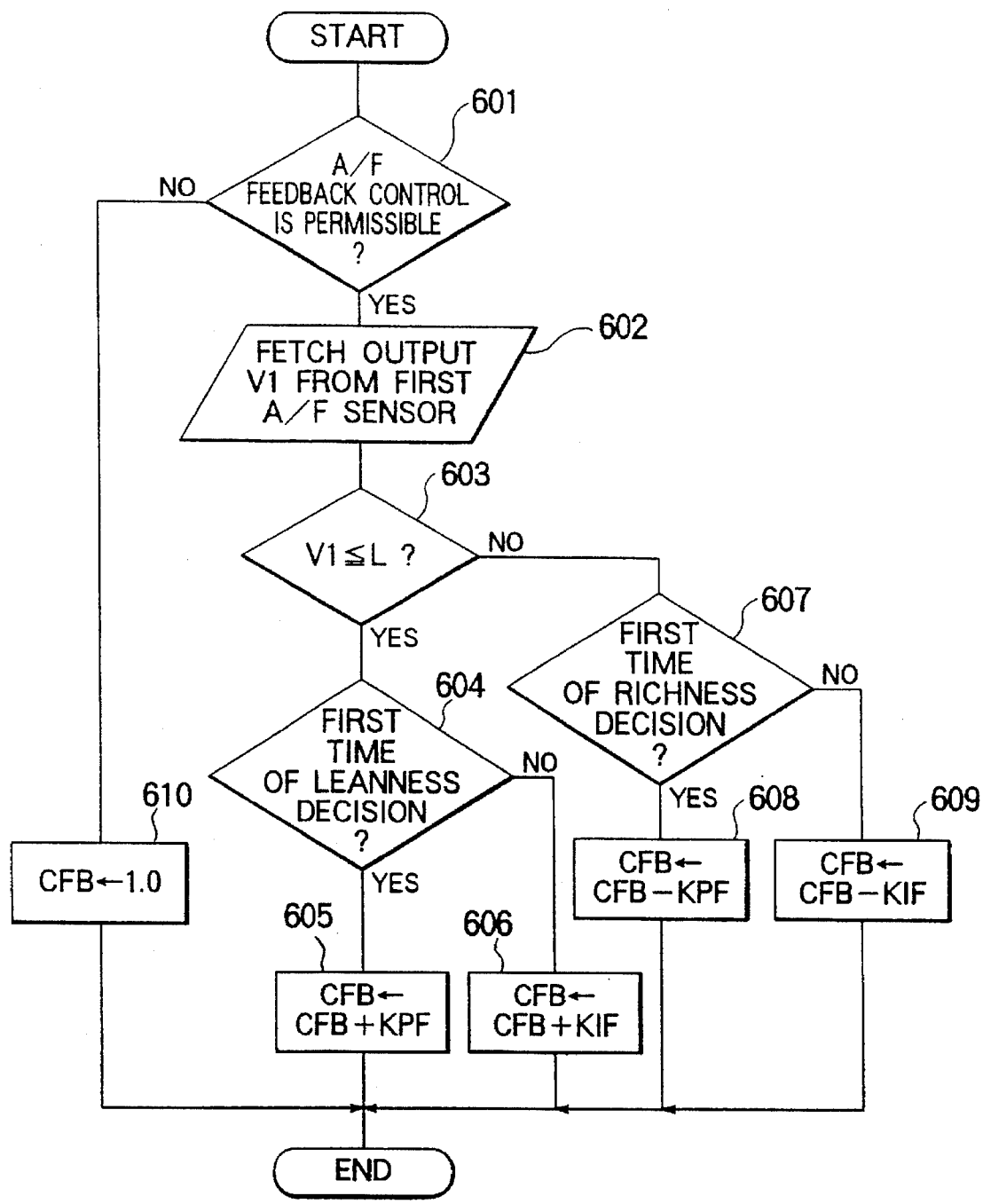
FIG. 8 is a flow chart for illustrating an air-fuel ratio correction processing executed by a comparison means and an air fuel ratio correcting means.

FIG. 8 is a flow chart for illustrating the air-fuel ratio correcting routine which corresponds to the functions of the comparison means M7 and the air-fuel ratio correcting means M8.

The air-fuel ratio correcting routine is executed periodically at a predetermined interval or in response to the interrupt signal supplied from the igniter system 13, as in the case of the integration value determining routine shown in FIG. 6 and the comparison value determining routine shown in FIG. 7.

First, in a step 601, decision is made as to whether or not the air-fuel ratio feedback control based on the output of the first air-fuel ratio sensor 11 is permissible, as with the case of the step 501 shown in FIG. 7. However, the information concerning whether the first air-fuel ratio sensor 11 is activated or not does not provide the basis for this decision.

When it is decided in the step 601 that the air-fuel ratio control is not permissible (NO), the air-fuel ratio correcting quantity CFB is set to a value of 1.0 (step 610), whereupon this air-fuel ratio correcting routine comes to an end (END).

On the other hand, when it is decided in the step 601 that the air-fuel ratio feedback control is permissible, the output V1 of the first air-fuel ratio sensor 11 is fetched (step 602), and decision is made in a step 603 as to whether the output V1 of the first air-fuel ratio sensor 11 is smaller than the comparison value L obtained through the comparison value determining routine described hereinbefore by reference to decision as to FIG. 7, i.e., whether the output V1 indicates rich or lean mixture (step 603).

The comparison value L is determined in accordance with the deviation or difference between the actual output V2 of the second air-fuel ratio sensor 12 and the ideal output V2t thereof, as described hereinbefore.

When leanness (V1≦L) is decided in the step 603, it is then checked whether the lean decision is the first time, i.e., whether or not it is a first change to the leanness in a step 604. If the first air-fuel ratio signal V1 indicates richness at the first time, the air-fuel ratio correcting quantity CFB is incremented by the proportional gain KPF in a step 605 and, if otherwise, the air-fuel ratio correcting quantity CFB is incremented by the integral gain KIF in a step 606.

In this manner, when the output V1 of the first air-fuel ratio sensor 11 indicates leanness as the result of comparison with the value L, integral action is performed for increasing gradually the amount of fuel injection. By executing this routine repeatedly, the air-fuel ratio correcting quantity CFB is incremented by the integral gain KIF. In this regard, it is assumed that the proportional gain KPF is set sufficiently greater than the integral gain KIF.

On the other hand, unless the decision step 603 indicates leanness (V1≦L), then it is checked whether this rich decision is the first time, i.e., whether or not a first change to the richness (step 607). If so, the air-fuel ratio correcting quantity CFB is decremented by the proportional gain KPF in a step 608. If otherwise, the air-fuel ratio correcting quantity CFB is decremented by the integral gain KIF in a step 609. The air-fuel ratio correcting routine then comes to an end.

In this manner, when the processing step 603 indicates that the output V1 of the first air-fuel ratio sensor 11 is greater than the comparison value L, the fuel injection amount is gradually decreased through the integral action. By executing repeatedly this routine, the air-fuel ratio correcting quantity CFB is gradually decreased by the integral gain KIF.

Through the processing described above by reference to FIGS. 6, 7 and 8, the air-fuel ratio correcting quantity CFB is determined, whereby the amount of fuel injected from the injector 5 (FIG. 5) is correspondingly corrected.

Figure 9:
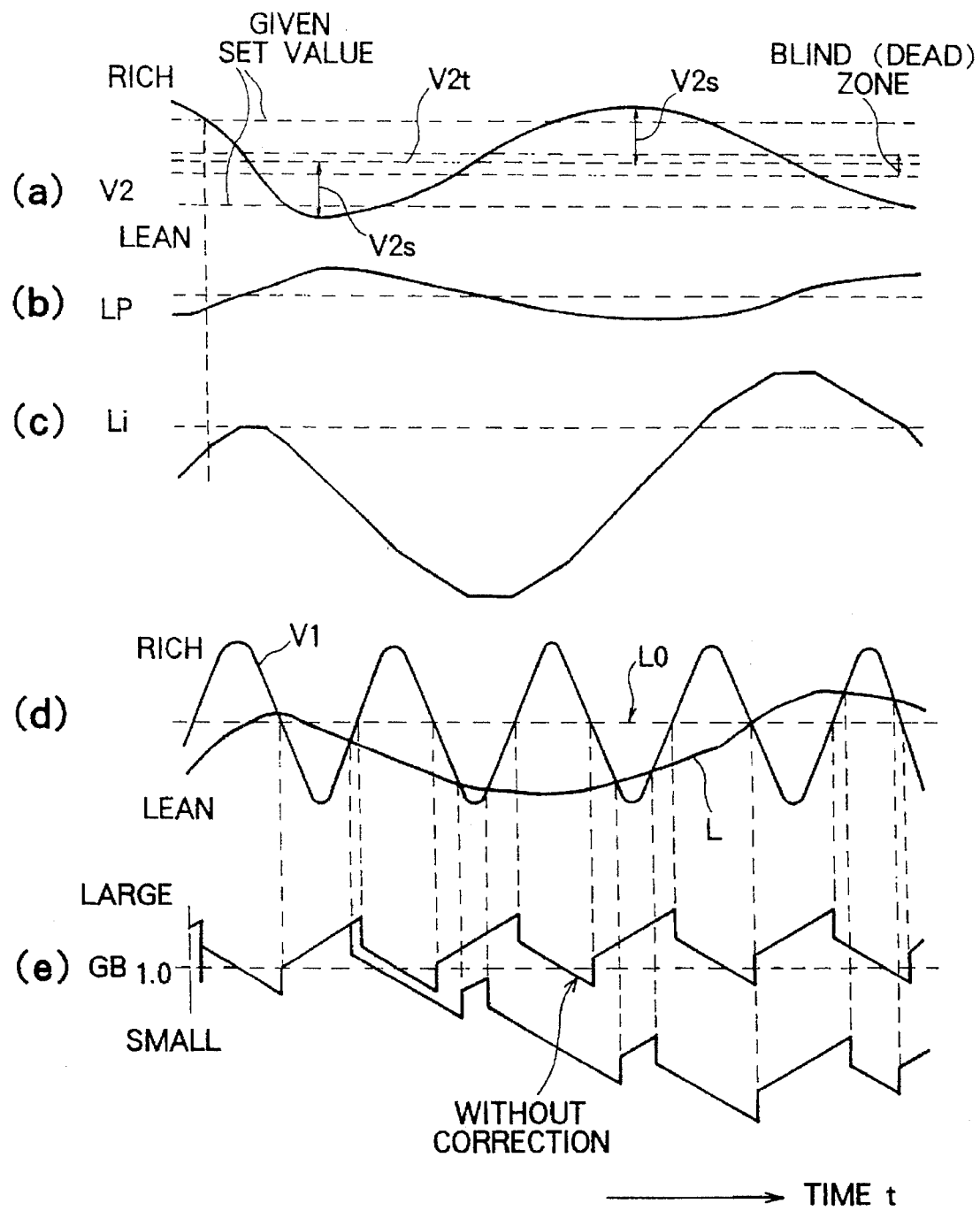
FIG. 9 is a timing chart illustrating graphically changes of various signals and quantities in the system shown in 5.

FIG. 9 is a timing chart illustrating changes of the various signals and quantities in the air-fuel ratio control system according to the instant embodiment.

As can be seen from a waveform diagram shown in FIG. 9 at (a), when the output V2 of the second air-fuel ratio sensor 12 changes, the difference or deviation V2S from the ideal output V2t for the same sensor 12 changes correspondingly, resulting in that the integration value Li obtained through the routine shown in FIG. 6 varies in such a manner as illustrated at (c) in FIG. 9. Further, the proportional value Lp obtained in the comparison value determining routine shown in FIG. 7 changes in such a manner as illustrated at (b) in FIG. II-7. Correspondingly, the comparison value L obtained from the comparison value determining routine (step 505) changes as shown by a curve L at (d) in FIG. 9. Further, when the comparison value L and the first air-fuel ratio signal V1 of the first air-fuel ratio sensor 11 change as shown at (d) in FIG. 9, the air-fuel ratio correcting quantity CFB determined through the routine shown in FIG. 8 changes in a manner indicated by a lower solid line curve at (e) in FIG. 9. Parenthetically, an upper solid line curve shown at (e) in FIG. 9 illustrates changes in the air-fuel ratio correcting quantity CFB in the case where the invention is not applied.

As can be seen from the waveforms shown in FIG. 9 at (a) to (e), the air-fuel ratio correcting quantity CFB can be regulated by controlling the value L for comparison with the output V1 of the first air-fuel ratio sensor 11, whereby the problem of the system known heretofore such as degradations of the fuel cost-performance, the exhaust gas emission characteristic and the drivability can be solved.

Embodiment 4

The instant embodiment corresponds to a modification of the third embodiment described above. More specifically, according to the instant embodiment, the amplitude of the output signal V1 of the first air-fuel ratio sensor 11 from the maximum and minimum values thereof is measured to thereby limit the comparison value L in accordance with the amplitude as measured. In this case, the air-fuel ratio feedback control can be performed more satisfactorily. At this juncture, it should be noted that when the comparison value L is being limited, the integral action is inhibited. The amplitude may be determined by sampling a predetermined number of amplitudes of the output signal of the first air-fuel ratio sensor 11 and averaging them. Alternatively, an experimentally or arithmetically obtained amplitude may be used to the substantially same effect.

Embodiment 5

Next, description will turn to the embodiments of the air-fuel ratio control system which is imparted with the catalytic converter diagnosis capability according to the third aspect of the invention with which it is contemplated to accomplish the third object mentioned hereinbefore. More specifically, the instant and subsequent embodiments are directed to improvement of reliability of the catalytic converter.

Figure 10:
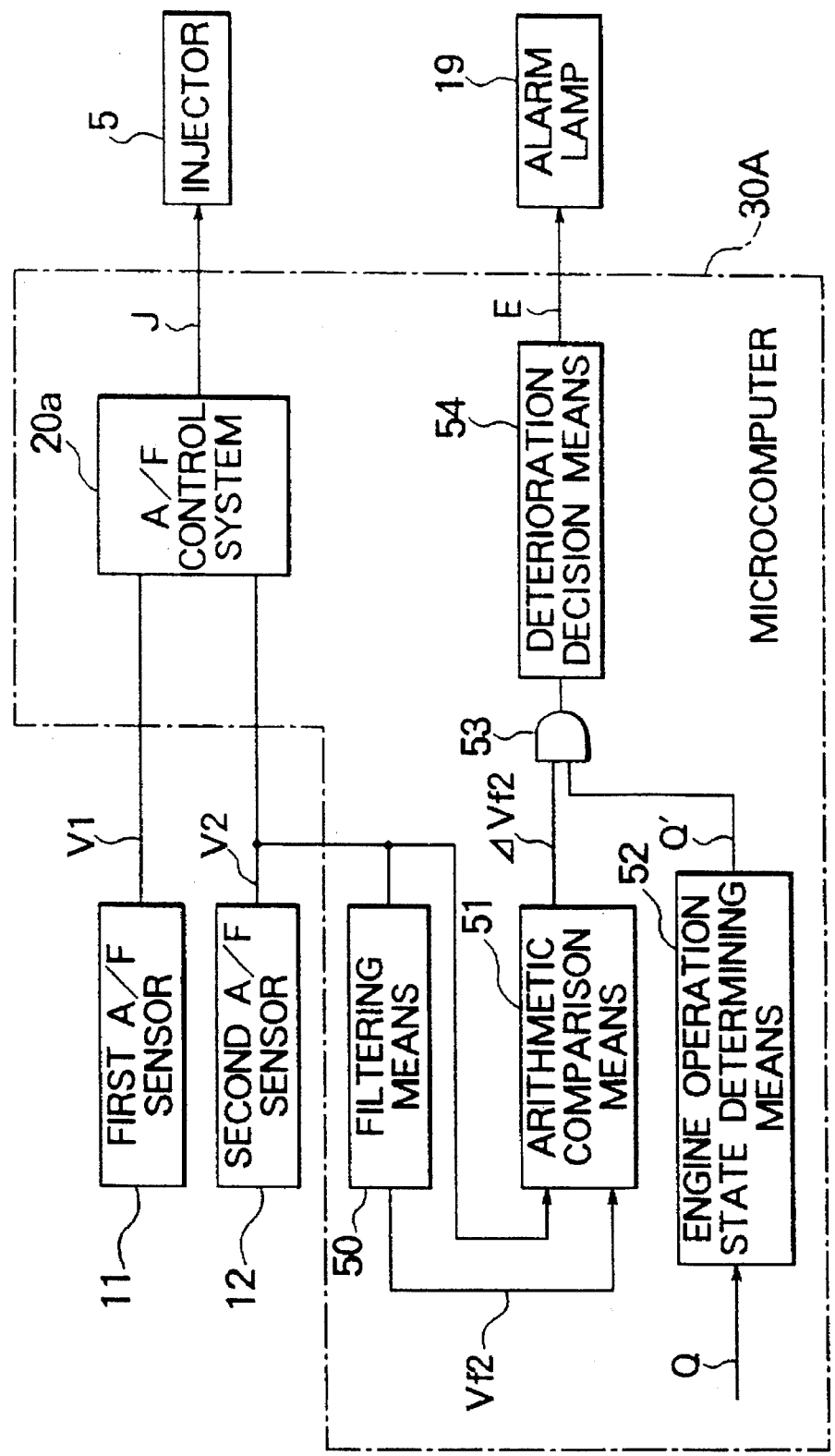
FIG. 10 is a functional block diagram showing a general arrangement of an air-fuel ratio control system provided with a catalytic converter deterioration diagnosis apparatus according to a fifth embodiment of the present invention.

FIG. 10 is a functional block diagram showing a general arrangement of an air-fuel ratio control system provided with a catalytic converter deterioration diagnosis apparatus for an internal combustion engine according to a fifth embodiment of the invention. The apparatus is comprised of a microcomputer 30A which corresponds to the microcomputer 30 described hereinbefore by reference to FIG. 25. Further, in FIG. 10, reference numerals 5, 11, 12 and 19 denotes the fuel injector, the first air-fuel ratio sensor, the second air-fuel ratio sensor and the alarm lamp, respectively, described previously in conjunction with FIGS. 24 and 25. Moreover, the structures of the air-fuel ratio control system 20a and the electronic control unit are essentially same as those shown in FIGS. 24 to 26. Accordingly, repeated description thereof will be unnecessary.

The catalytic converter deterioration decision capability or function according to the instant embodiment can be realized softwarewise by the microcomputer 30A. A filtering means 50 such as described hereinbefore by reference to FIGS. 1 and 4 is additionally provided for filtering the second air-fuel ratio signal V2 to thereby generate a filtered second air-fuel ratio signal Vf2, wherein the time constant of the filtering means 50 is set in a range of 100 milliseconds to 300 milliseconds for the purpose of suppressing the variation or fluctuation in deterioration parameter value mentioned later on.

Further, an arithmetic comparison means 51 is provided for comparing the second air-fuel ratio signal V2 with the filtered second air-fuel ratio signal Vf2 to thereby output a difference or deviation ΔVf2 between the second air-fuel ratio signal V2 and the filtered second air-fuel ratio signal Vf2 as the result of comparison. An operation state decision means 52 serves to detect discriminatively the operation states of the engine on the basis of the operation state signal inclusive of the water temperature signal T, the throttle opening degree signal φ and others and representatively denoted by an operation state signal Q. By way of example, when the engine rotation speed (rpm) and the engine load lie within predetermined ranges, respectively, i.e., when the operation state is within a predetermined range, the operation state decision means 52 outputs a normal or steady operation state signal Q', which is supplied to an input of an AND gate 53. In response, the AND gate 53 is enabled to allow the deviation signal ΔVf2 from the second air-fuel ratio signal V2 to pass therethrough. When the deviation signal ΔVf2 exceeds a predetermined value, the deterioration decision means 54 determines deterioration of the catalytic converter 10 (not shown in FIG. 10 but shown in FIG. 24). The filtering means 50, the arithmetic comparison means 51 and the deterioration decision means 54 constitutes the aforementioned catalytic converter deterioration diagnosis apparatus which is realized by the microcomputer 30A in association with the air-fuel ratio control system 20a.

Operation of the diagnosis apparatus according to the instant embodiment will first be described in general.

The air-fuel ratio control system 20a generates the fuel injection control signal J on the basis of the first air-fuel ratio signal V1 and the second air-fuel ratio signal V2 as described hereinbefore for controlling optimally the amount of the fuel injected by the fuel injector 5 and hence the air-fuel ratio. On the other hand, the filter processing means 50 of the catalytic converter deterioration diagnosis apparatus generates the filtered air-fuel ratio signal Vf2 of the second air-fuel ratio signal V2 while the arithmetic comparison means 51 determines the difference or deviation ΔVf2 between the second air-fuel ratio signal V2 and the filtered second air-fuel ratio signal V2. Further, the operation state decision means 52 makes decision on the basis of the engine rotation (rpm) signal R, the throttle opening degree φ, the engine rotation speed and the coolant temperature T (generally denoted by) as to whether or not the engine operation state is in the normal state. If so, the normal operation state signal Q' is generated to open or enable the AND gate 53, as a result of which the deviation signal ΔVf2 is inputted to the catalytic converter deterioration diagnosis means 54. In this regard, it is to be mentioned that the engine operation state may alternatively be determined on the basis of the intake air temperature and the air amount. Thus, in the engine operation state amenable to the deterioration decision, the deterioration decision means 54 decides whether or not the deviation ΔVf2 exceeds a predetermined value (deterioration decision reference level). If the deterioration decision results in affirmation (YES), the alarm lamp 19 is activated to inform the driver of deterioration of the catalytic converter 10. Thus, the driver can immediately take measures to cope with the deterioration of the catalytic converter.

Figure 11:
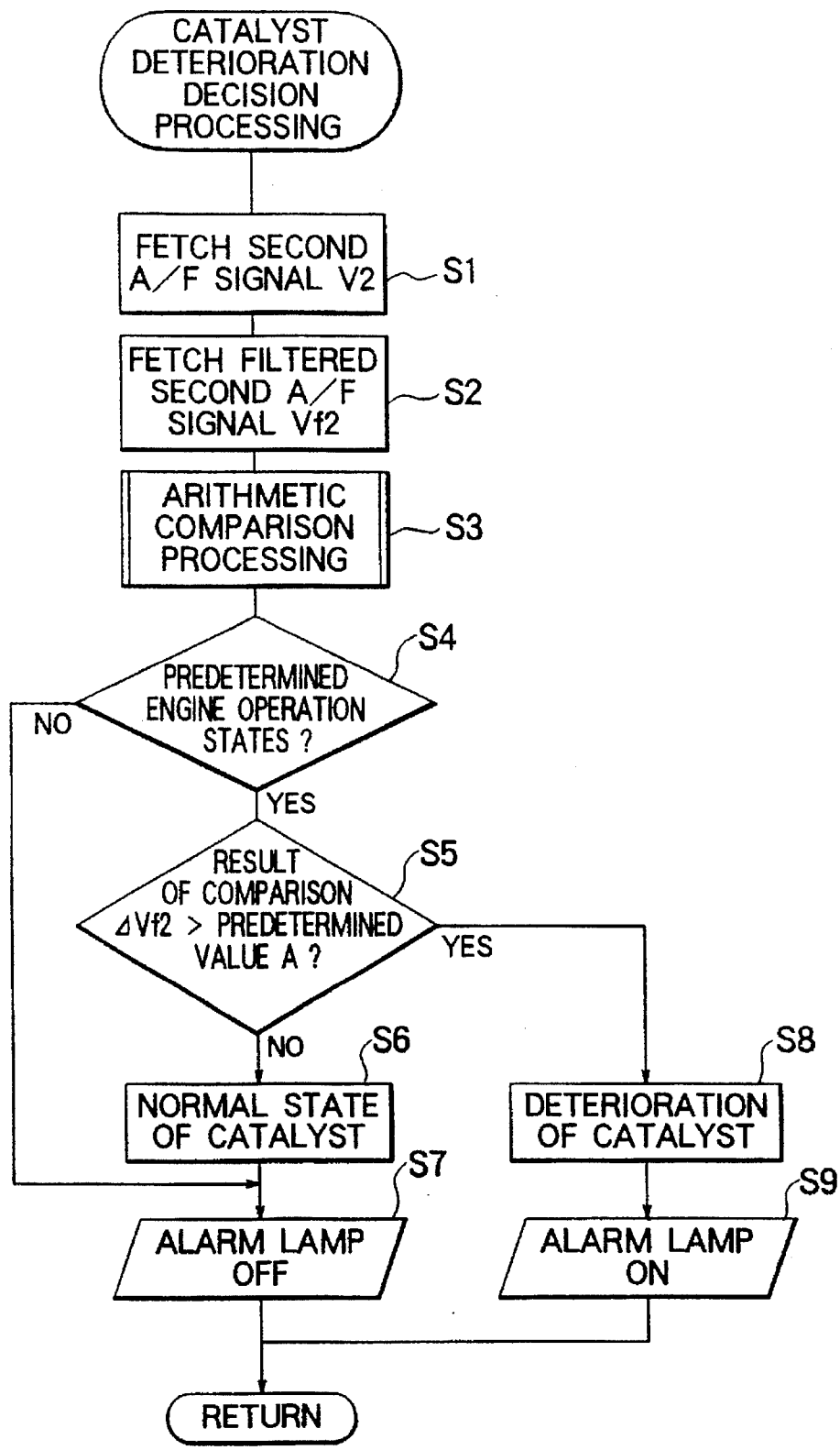
FIG. 11 is a flow chart for illustrating a processing executed by the catalytic converter deterioration diagnosis apparatus shown in FIG. 10.

Next, referring to a flow chart of FIG. 11, the processing performed by the catalytic converter deterioration diagnosis means will be described in concrete.

First, the second air-fuel ratio signal V2 is fetched from the second air-fuel ratio sensor 12 (step S1) and at the same time the filtered second air-fuel ratio signal Vf2 is fetched from the filtering means 50 (step S2). Subsequently, the second air-fuel ratio signal V2 is compared with the filtered second air-fuel ratio signal Vf2 (step 3), whereby the difference or deviation ΔVf2 is determined. Next, in a step S4, decision is made on the basis of the engine signal Q whether the engine operation state is in the predetermined normal state. When the decision step S4 results in affirmation (YES), then it is decided whether or not the deviation ΔVf2 is greater than a predetermined value A (step S5). Parenthetically, the operation state decision step S4 is executed through cooperation of the operation state decision means 52 and the AND gate 53, while the deviation comparison step S5 is executed by the deterioration decision means 54.

If the answer of the decision step S5 is negative (NO), i.e., ΔVf2≦A, it is decided that the catalytic converter 10 is normal (step S6). Accordingly, the alarm or abnormality signal E is not generated. Thus, the processing routine comes to an end with the alarm lamp 19 being left off (step S7).

On the other hand, when the decision step S5 results in that ΔVf2>A, it is then decided that the catalytic converter 10 is deteriorated, whereupon the abnormality signal E is generated (step S8). Consequently, the alarm lamp 19 is lit (step S9). Then, the routine comes to an end (RETURN).

Further, when the operation state decision step S4 results in negation (NO), the processing skips the step S5 to the step S7.

Figure 12:
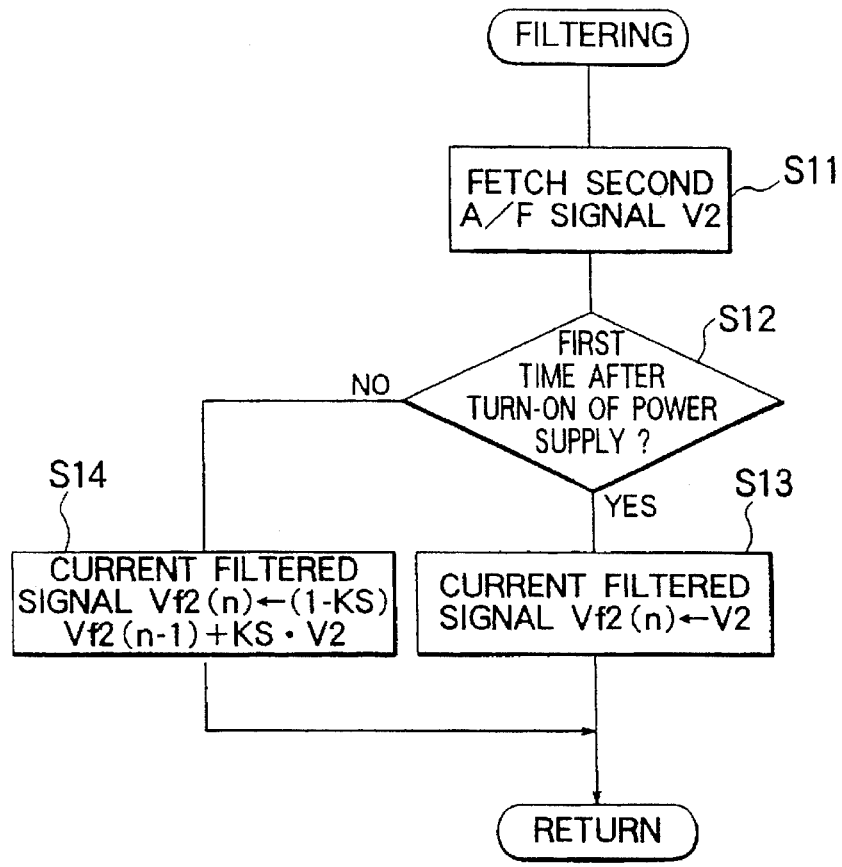
FIG. 12 is a flow chart illustrating a filtering operation performed by a filtering means shown in FIG. 10.
Figure 13:
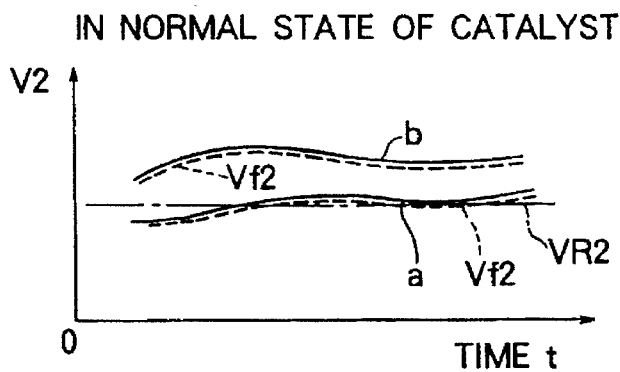
FIG. 13 is a view illustrating graphically the filtering operation of the above-mentioned filtering means.
Figure 14:
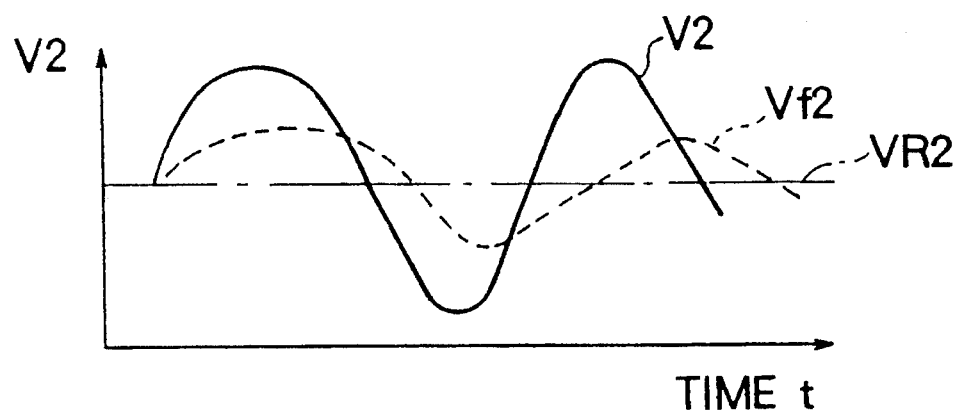
FIG. 14 is a view illustrating graphically the filtering operation of the above-mentioned filtering means.

Next, referring to a flow chart of FIG. 12 and waveform diagrams of FIGS. 13 and FIG. 14, description will be directed to the operation of the processing means 50. In this regard, it should be mentioned that the filtering routine shown in FIG. 12 may be executed periodically at a time interval, for example, of 10 milliseconds.

Referring to FIG. 12, the second air-fuel ratio signal V2 is fetched from the output of the second air-fuel ratio sensor 12 in a step S11, which is followed by a step S12 where decision is made as to whether the fetching or reading of the second air-fuel ratio signal V2 is the first time after the turn-on of the power supply. If the answer of the decision step S12 is affirmative (YES), the second air-fuel ratio signal V2 is set as the initial value for the filtered second air-fuel ratio signal Vf2(n) in a step S13, whereupon this filtering routine comes to an end (RETURN).

On the other hand, when the decision step S12 results in negation (NO), the current air-fuel ratio signal V2 undergoes a linear filtering given by the following expression (1) (step S14).

$$Vf2(n) = (1-Ks) \times Vf2(n-1) + Ks \times V2 \qquad (2)$$

where Vf2(n) represents the currently filtered air-fuel ratio signal, and Ks represents a filtering coefficient which is set within a range given by 0<Ks<1. As is apparent from the above expression (2), the second air-fuel ratio signal V2 is converted to the filtered air-fuel ratio signal Vf2 with a delay in the response time which corresponds to a time constant of the filtering means 50 which ranges from 100 milliseconds to 300 milliseconds. The filtered air-fuel ratio signal Vf2 is then inputted to the arithmetic comparison means 51. At that time, the waveform of the filtered air-fuel ratio signal Vf2 is such as indicated by a broken line curve (Vf2) shown in FIG. 13 when the catalytic converter 10 functions normally, while it takes a waveform shown by a broken line curve (Vf2) in FIG. 14 when the purifying capability of the catalytic converter 10 is deteriorated.

More specifically, when the catalytic converter 10 is normal, there can be obtained the filtered air-fuel ratio signal Vf2 (indicated by broken curve) which follows at least approximately the second air-fuel ratio signal V2 even when the level of the second air-fuel ratio signal V2 shifts from a solid line curve a to a curve b. In that case, the waveform of the filtered air-fuel ratio signal Vf2 essentially coincides with that of the second air-fuel ratio signal V2 because of the large time constant of 100 milliseconds to 300 milliseconds.

On the other hand, when the catalytic converter 10 suffers deterioration, the level of the filtered air-fuel ratio signal Vf2 differs significantly from that of the second air-fuel ratio signal V2 and intersects periodically the second target value VR2 due to a large delay in the response time to the second air-fuel ratio signal V2 (solid line curve) of a large amplitude. In this manner, the filtered air-fuel ratio signal Vf2 which conforms constantly with the second air-fuel ratio signal V2 can be employed as the comparison reference in place of the second target value VR2.

Thus, the deviation ΔVf2 outputted from the arithmetic comparison means 51 always assumes a level smaller than the predetermined value A independent of the variation in the second air-fuel ratio signal V2 so far as the catalytic converter 10 is normal, even when the second air-fuel ratio signal V2 shifts to such extent that it does not intersect the second target value VR2, as indicated by a solid line curve shown in FIG. 13. In contrast, when the catalytic converter 10 suffers deterioration, as shown in FIG. 5, the level of the deviation signal ΔVf2 increases beyond the predetermined value A.

As will be appreciated from the above, by setting the filtered air-fuel ratio signal Vf2 of the second air-fuel ratio signal V2 as the reference for comparison, there can be obtained from the arithmetic comparison means 51 the deviation or difference signal ΔVf2 which is insusceptible to variation or fluctuation of the second air-fuel ratio signal V2 from the arithmetic comparison means 51. Further, the deterioration decision means 54 can determine with high accuracy the deterioration of the catalytic converter 10 on the basis of the deviation signal unwanted situation can be avoided where decision as to deterioration of the catalytic converter 10 is impossible or where erroneous deterioration decision is made notwithstanding of normal state of the catalytic converter 10.

Embodiment 6

In the case of the instant embodiment, the arithmetic comparison means 51 outputs the deviation signal ΔVf2 as the result of the comparison between the second air-fuel ratio signal V2 and the filtered second air-fuel ratio signal Vf2, the operation state decision means 52 decides the engine operation state, and the deviation signal ΔVf2 is enabled to pass through the AND gate 53 only when the engine operation state is normal or steady, whereon the deterioration decision means 54 compares the deviation ΔVf2 with the predetermined value. However, a value mentioned below is utilized as the deterioration parameter value.

More specifically, the number of times n the second air-fuel ratio signal V2 intersects the second filtered air-fuel ratio signal Vf2 in the normal or steady engine operation state can be utilized as the basis for determining the deterioration of the catalytic converter. In this case, the arithmetic comparison means for counting the number of times the second air-fuel ratio signal V2 intersects the filtered air-fuel ratio signal Vf2 may be realized by the operation state decision means 52 and 53 shown in FIG. 10.

Figure 15:
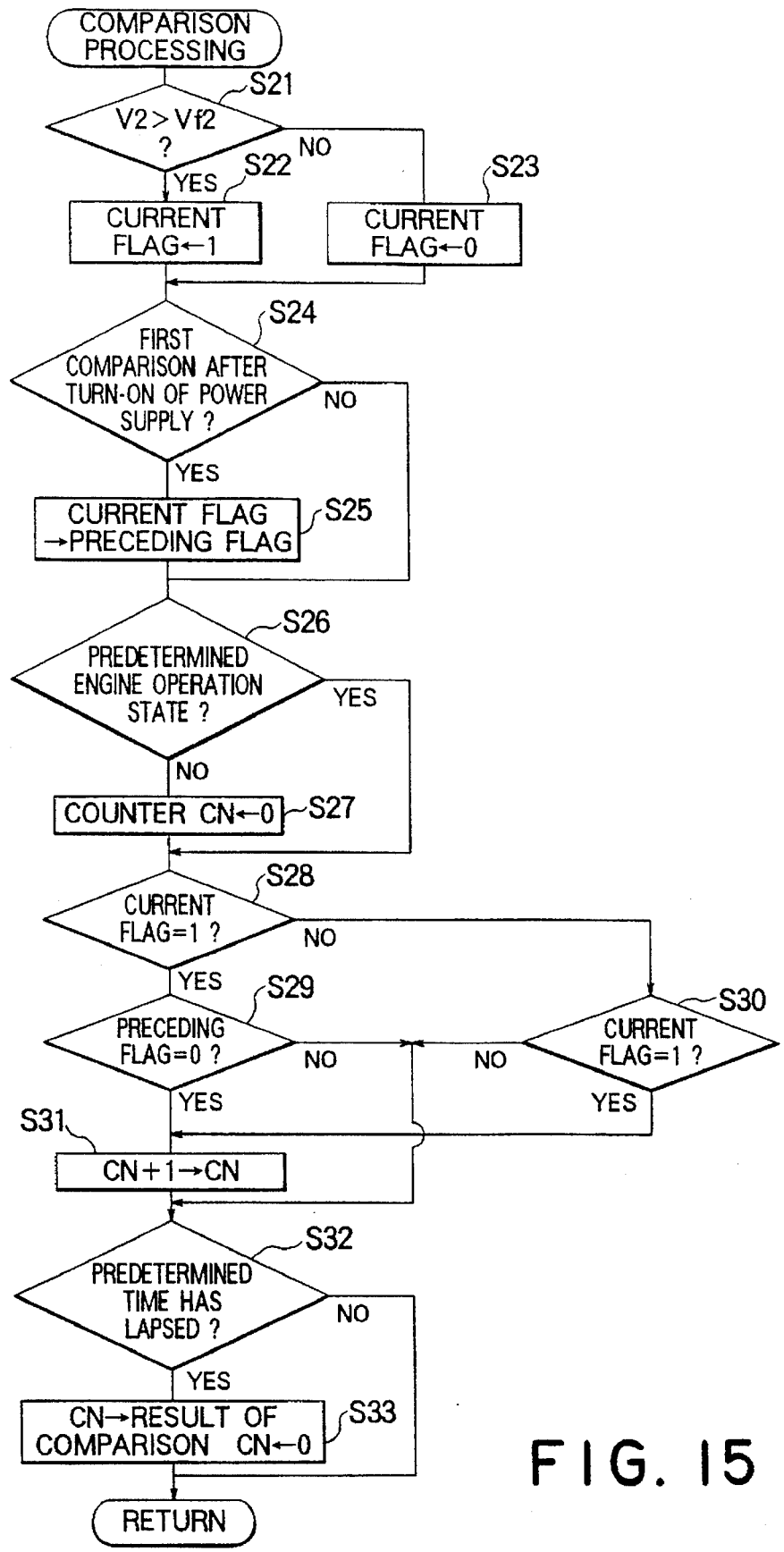
FIG. 15 is a flow chart for illustrating a comparison processing performed in a catalytic converter deterioration diagnosis apparatus according to a sixth embodiment of the invention.

Next, the comparison processing according to the instant embodiment will be elucidated in concrete by referring to FIG. 15.

First, decision is made as to whether or not the second air-fuel ratio signal V2 exceeds the filtered second air-fuel ratio signal Vf2 (step S21). When V2>Vf2, a corresponding flag is set to "1" (step S22), and the second air-fuel ratio signal V2 is regarded as indicating the air-fuel mixture is rich more or less. In contrast, when V2≦Vf2, the flag is reset to "0" (zero) in a step S23.

When the state of the current flag is determined in the step S22 or S23, a decision step S24 is then executed to decide whether the comparison is the first time after the turn-on of the power supply. If so, the value of the current flag is initialized to the preceding flag value (step S25). If otherwise, the step S25 is skipped.

Subsequently, decision is made as to whether the engine operation is in the predetermined normal state in a step S26. If this decision step S26 results in negation (NO), a counter CN is reset to zero (step S27). If otherwise, the reset step S27 is skipped.

Next, in a step S28, decision is made as to whether the current flag is "1". If so, then it is checked whether the preceding flag is "0" in a step S29. Unless the current flag is set to "1" (i.e., if it is set to "0"), then the preceding flag is checked to determine whether it is "1" in a step S30.

In this manner, in the steps S29 and S30, it is checked whether the current flag and the preceding flag differ from each other. In other words, it is decided whether the second air-fuel ratio signal V2 has intersected the filtered air-fuel ratio signal Vf2 to thereby bring about inversion of the current flag value relative to the preceding flag value.

When the result of the decision step S29 or S30 is "YES", the counter CN is incremented in a step S31 to count the number of times the filtered second air-fuel ratio signal Vf2 is intersected by the second air-fuel ratio signal V2 (i.e., the number of flag inversions). On the other hand, when the decision step S29 or S30 results in "NO", the step S31 is skipped.

Next, it is checked in a step S32 whether a predetermined time has lapsed in the normal engine operation state. If so, the value of the counter CN is reset to "0" in a step S33 and the routine comes to an end (RETURN). When the decision step S32 results in "NO", the step S33 is skipped, whereon the processing comes to an end (RETURN).

As the result of the processing described above, the number n of inversions of the flag value (the number of intersections) is inputted to the deterioration decision means as the deterioration parameter value, whereby deterioration of the catalytic converter is determined when the number n exceeds a predetermined number.

Embodiment 7

In the case of this embodiment, the number n of flag value inversions is determined by the arithmetic means with the inversion number being inputted to the deterioration decision means as the deterioration parameter value. However, it should be noted that the inversion period τ which is taken for the inversion of the flag value may equally be utilized as the deterioration parameter.

To this end, measurement of the inversion period τ may be realized by a timer function incorporated in the microcomputer 30A to the substantially same effect.

Embodiment 8

Figure 31:
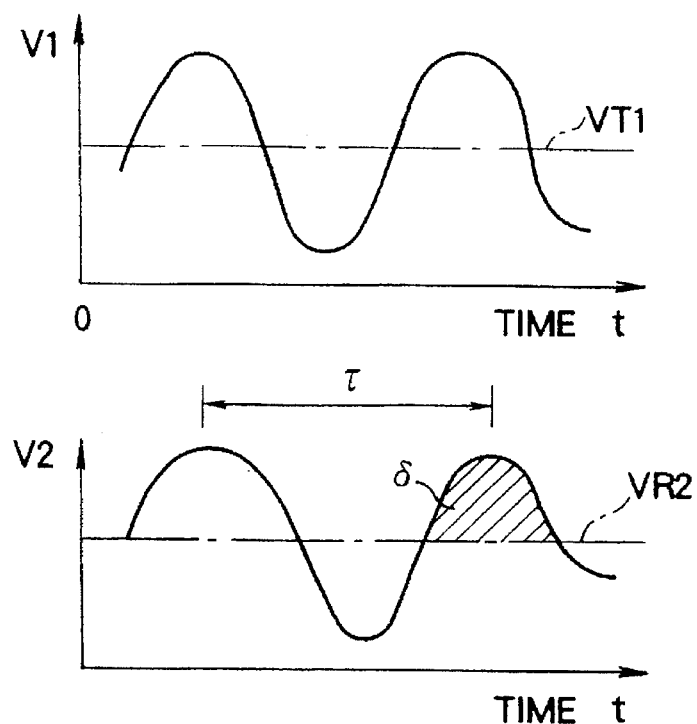
FIG. 31 is a waveform diagram of signals outputted by upstream and downstream sensors when a catalytic converter is deteriorated.
Figure 32:
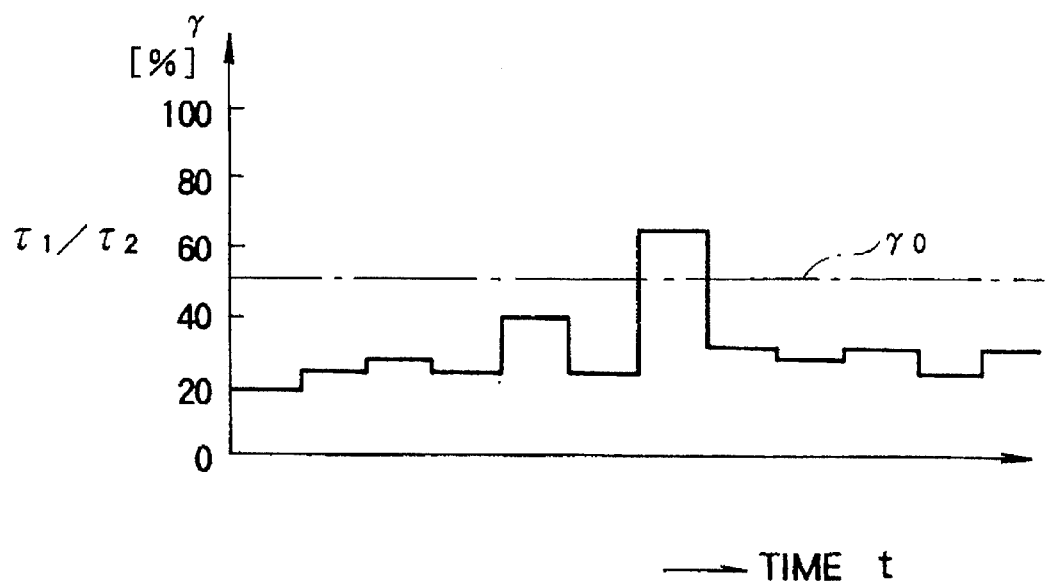
FIG. 32 is a view for graphically illustrating change in a catalyst deterioration decision parameter.

For detecting the deviation of the air-fuel ratio downstream of the catalytic converter 10 with high accuracy, a value of integration of the deviation ΔVf2 (corresponding to the area δ shown in FIG. 31 may be used as the deterioration parameter value.

Figure 16:
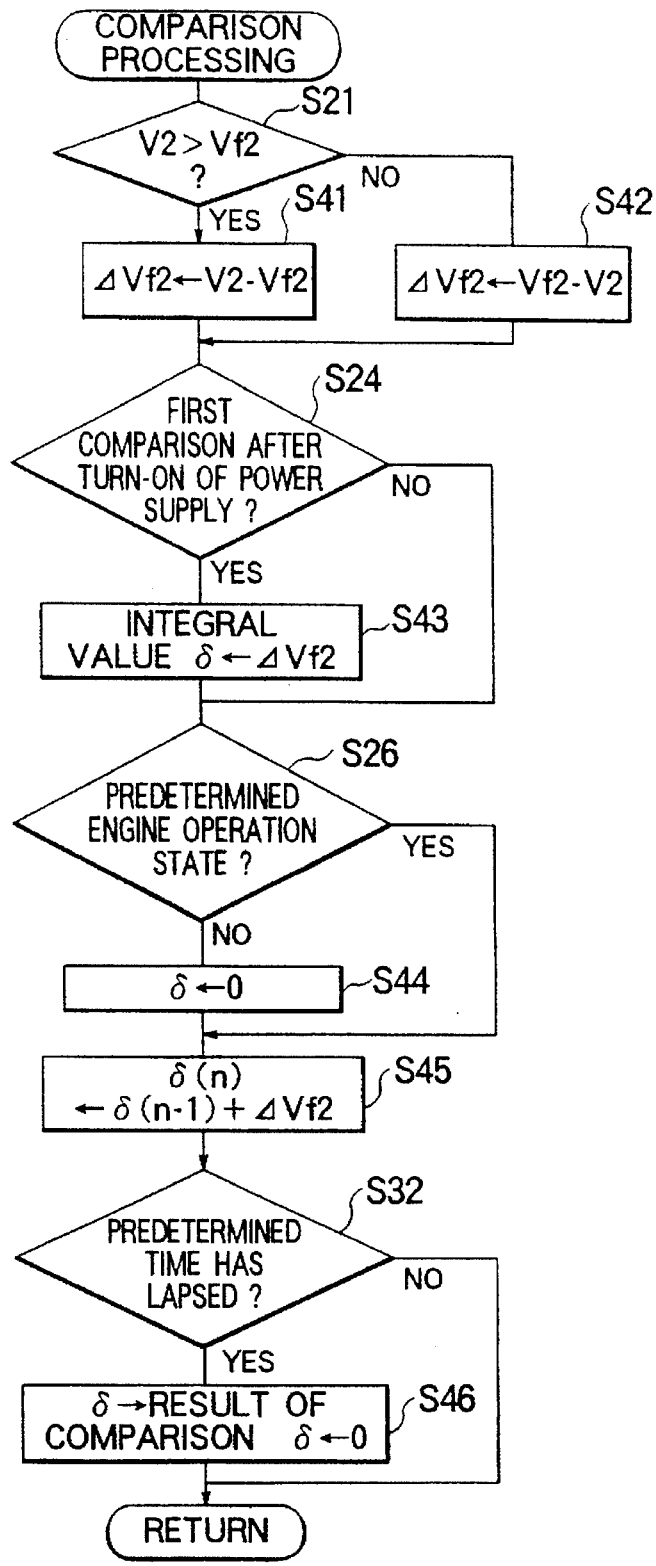
FIG. 16 is a flow chart for illustrating a comparison processing performed in a catalytic converter deterioration diagnosis apparatus according to a eighth embodiment of the invention.

Next, referring to a flow chart of FIG. 16 the processing for determining the integration value δ according to the instant embodiment will be described. In FIG. 16 the steps S21, S24, S26 and S32 are the same as those designated by the like reference symbol in FIG. 15.

First, the second air-fuel ratio signal V2 is compared with the filtered second air-fuel ratio signal Vf2 in a step S21. When V2>Vf2, the deviation ΔVf2 is determined in a step S41. On the other hand, when V2≦Vf2, the deviation ΔVf2 is determined by subtracting the second air-fuel ratio V2 from the filtered air-fuel ratio Vf2 in a step S42.

When it is decided in a step S24 that this is the first comparison after the turn-on of the power supply, the deviation ΔVf2 determined currently is set as an initial value for the integration value δ in a step S43. If otherwise, the step S43 is skipped. Further, when it is decided in a step S26 that the engine operation state is not normal, the value δ is set to zero in a step S44, and if otherwise, this step S44 is skipped.

Subsequently, in a step S45, the current integration value δ(n) is determined in accordance with the expression (3) given below:

$$\delta(n)=\delta(n-1)+\Delta Vf2 \quad (3)$$

In the above expression (3), the term δ(n−1) represents the preceding integration value with the term ΔVf2 representing the current deviation.

Finally, in a step S32, it is confirmed that the normal operation state has continued for a predetermined time, whereon the integration value δ is set as the result of the comparison, which is then followed by the resetting of the integration value δ to zero (step S46).

Embodiment 9

In the case of the fifth to eighth embodiments described above, the filtered second air-fuel ratio signal Vf2 determined on the basis of second air-fuel ratio signal V2 is used intact for the comparison. However, in consideration of the fact that noise may be superposed on the second air-fuel ratio signal V2, the filtered air-fuel ratio signal Vf2 may be imparted with hysteresis corresponding to a noise elimination quantity (i.e., quantity required for eliminating noise).

More specifically, when V2>Vf2, the noise elimination quantity is subtracted from the filtered air-fuel ratio signal Vf2, while when V2≦Vf2, the noise elimination quantity is added to the filtered air-fuel ratio signal Vf2 to thereby increase the deviation ΔVf2 so that the latter is protected against the influence of noise. In this manner, a margin for noise is secured, whereby detection of deterioration of the catalytic converter can be realized with high accuracy and reliability.

Embodiment 10

In each of the fifth to ninth embodiments described above, the catalyst deterioration decision function is validated only in the predetermined normal operation state of the engine. According to the instant embodiment, it is proposed that the predetermined value with which the deterioration parameter value is compared by the deterioration decision means 54 is changed correspondingly in accordance with change in the engine operation state. By virtue of this feature, the range of the engine operation states which permits the catalyst deterioration decision can be enhanced while ensuring high reliability.

Embodiment 11

In the case of the fifth to tenth embodiments described above, deterioration of the catalytic converter 10 is decided on the basis of only the second air-fuel ratio signal V2. In this regard, it is noted that the air-fuel ratio control based on the first air-fuel ratio signal V1 may vary in dependence on the change in the engine operation state, as a result of which change in the second air-fuel ratio signal V2 is increased to such extent that the catalyst deterioration decision is adversely influenced.

Thus, according to the instant embodiment, it is proposed to perform the catalyst deterioration decision on the basis of both the second air-fuel ratio signal V2 and the first air-fuel ratio signal V1 to thereby realize detection of deterioration of the catalytic converter with further enhanced reliability while suppressing error involved in the air-fuel ratio control to a minimum.

Figure 17:
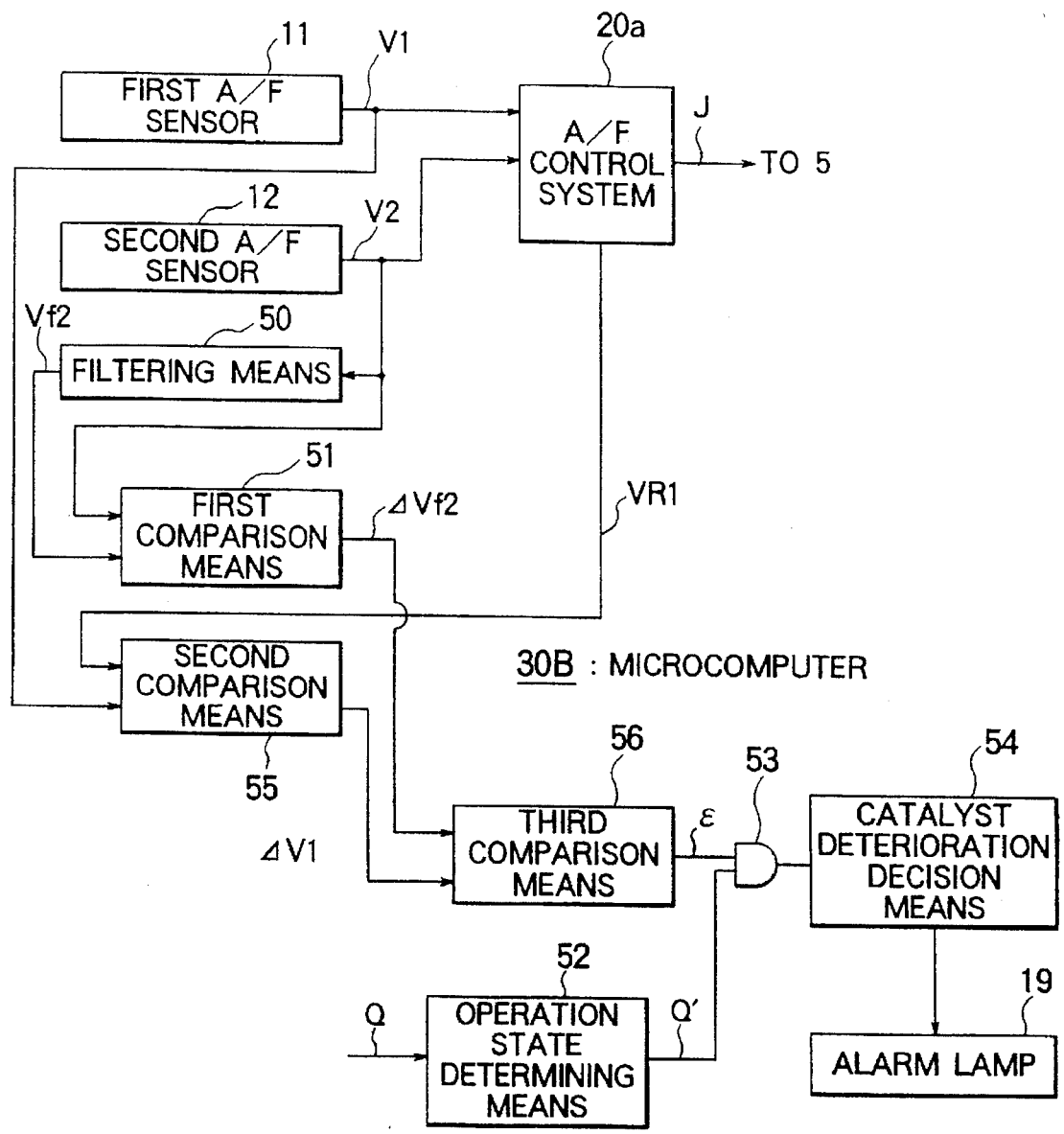
FIG. 17 is a functional block diagram showing a general arrangement of the catalytic converter deterioration diagnosis apparatus according to an eleventh embodiment of the present invention.

FIG. 17 is a block diagram showing an arrangement of the catalytic converter deterioration diagnosis apparatus according to the instant embodiment.

Referring to the figure, a second arithmetic comparison means 55 is provided for comparing the first air-fuel ratio signal V1 with a target value VR1 therefor to thereby generate a deviation ΔV1 of the first air-fuel ratio signal V1 from the target value VR1 therefor (richness/leanness means parameter value) as a second comparison result. Further, a third arithmetic comparison means 56 is provided for comparing the difference or deviation ΔVf2 (first comparison result) outputted from the first arithmetic comparison means 51 mentioned hereinbefore with the deviation ΔV1 (second comparison result obtained from the second arithmetic comparison means 55) to thereby generate a deviation ratio ε(=ΔV1/ ΔVf2) as a third comparison result. The second arithmetic comparison means 55 and the third arithmetic comparison means 56 are implemented in the microcomputer 30B together with the air-fuel ratio control system 20a, the deterioration decision means 54 and others.

The deterioration decision means 54 compares the deterioration parameter value represented by the third comparison result or the deviation ratio ε with a predetermined value reflecting the engine operation state and determines deterioration of the catalytic converter 10 when the parameter value ε exceeds the predetermined value. Since the deviation ratio ε reflects the state of the air-fuel ratio control system 20a, the influence of the first air-fuel ratio signal V1, i.e., influence of change in the air-fuel ratio control state can satisfactorily be suppressed, whereby the accuracy of the catalyst deterioration decision can further be enhanced.

Embodiment 12

The instant embodiment corresponds to a combination of the tenth and eleventh embodiments described above. More specifically, it is proposed that in the apparatus according to the instant embodiment, the target value VR1 for the first air-fuel ratio signal V1 is imparted with hysteresis in the same manner as described in conjunction with the tenth embodiment to thereby suppress the influence of noise superposed on the first air-fuel ratio signal V1.

Further, in place of using the deviation ΔV1 determined by the second arithmetic comparison means 55 as the deterioration parameter value, the number of times the first air-fuel ratio signal V1 intersects the target value VR1 set therefor, the period or the integration value δ defined previously may be used as the deterioration parameter value. Similarly, the number of times the air-fuel ratio control value is changed, i.e., the number of changes in the fuel injection feedback correction or period of the changes may equivalently be used as the deterioration parameter value.

Embodiment 13

In the fifth to twelfth embodiments described above, deterioration of the catalytic converter 10 is determined on the basis of the calculated deterioration parameter value without paying attention to the level of the second air-fuel ratio signal V2. In this regard, it should be mentioned that since the purifying capability of the catalytic converter 10 for the exhaust gas components becomes maximum in the vicinity of the stoichiometrically optimal air-fuel ration of 14.7 at which reaction of oxidation/reduction is easy to take place, the deterioration of the catalytic converter 10 is determined nevertheless of the state thereof, when the air-fuel ratio is deviated remarkably from the optimal air-fuel ratio value mentioned above.

Thus, according to the invention incarnated in the instant embodiment, there is provided in association with the air-fuel ratio detector a means for inhibiting the deterioration decision when the air-fuel ratio lies outside of a predetermined range. By way of example, let's assume that the second air-fuel ratio signal V2 is generated by an $O_2$-sensor. In that case, the output voltage level of the $O_2$-sensor is checked as to whether it lies within a range of 0.1 V to 0.8 V, and the deterioration decision is inhibited when the output voltage of the $O_2$-sensor is lower than 0.1 V or higher than 0.8 V. In this manner, the catalytic converter deterioration decision can be performed only when the air-fuel ratio falls within a predetermined range, whereby reliability of the catalytic converter deterioration decision can further be enhanced.

Embodiment 14

In the case of the fifth to thirteenth embodiments the second air-fuel ratio signal V2 is subjected to the filtering operation. However, as an alternative, the deterioration parameter value calculated on the basis of at least the second air-fuel ratio signal V2 may be filtered.

The instant embodiment will be described by reference to a functional block diagram of FIG. 18, flow charts of FIGS. 19 and 20 and a waveform diagram of FIG. 21.

Figure 18:
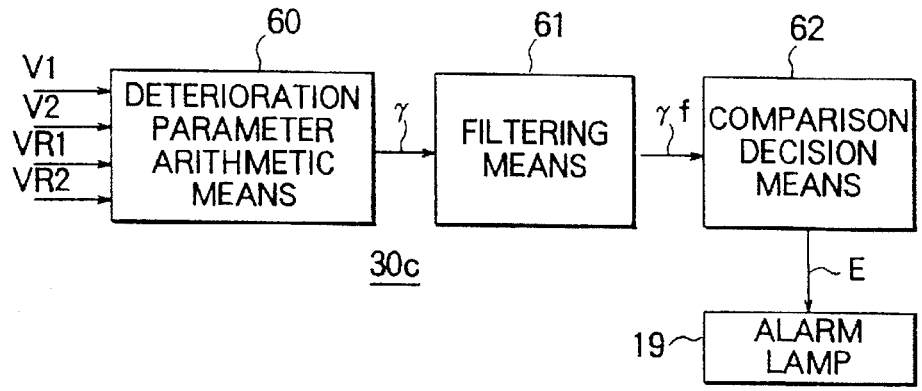
FIG. 18 is a functional block diagram showing another embodiment of the catalytic converter deterioration diagnosis apparatus according to the invention.
Figure 19:
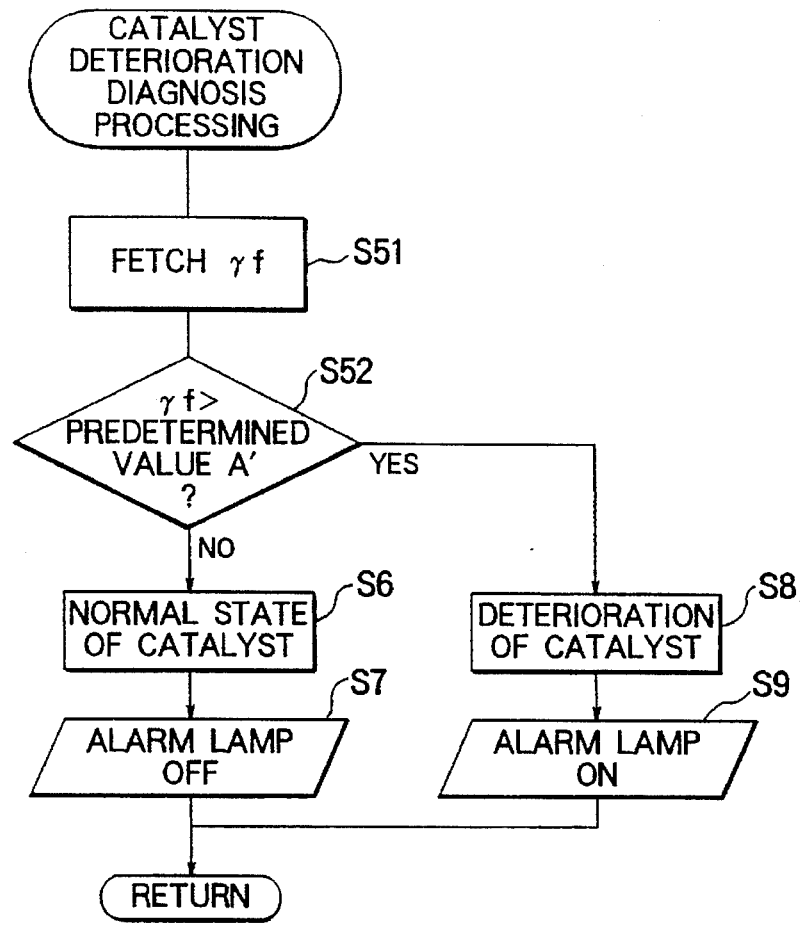
FIG. 19 is a flow chart for illustrating a processing executed in the apparatus shown in FIG. 18.

Referring to FIG. 18, there is provided a deterioration parameter calculating means 60 which is adapted to calculate the deterioration parameter value periodically at a predetermined time interval on the basis of at least the second air-fuel ratio signal V2 to thereby output as the deterioration parameter a ratio $\gamma$ between the aforementioned inversion periods $\tau$ of the first air-fuel ratio signal V1 and the second air-fuel ratio signal V2 while taking into account the target value VR1 for the first air-fuel ratio signal V1 and the second target value VR 2 therefor.

A filtering means 61 serves to filter the deterioration parameter value $\gamma$ every time it is calculated, to thereby output a filtered parameter value $\gamma f$, which is then inputted to a comparison decision means 62 to be compared with a predetermined value. When the filtered parameter value $\gamma f$ exceeds the predetermined value, deterioration of the catalytic converter is determined, resulting in generation of the abnormality signal E. The deterioration parameter calculating means 60, the filtering means 61 and the comparison/decision means 62 are incorporated in a microcomputer generally denoted by a numeral 30C.

Next, referring to the flow chart of FIG. 19, the catalyst deterioration decision processing according to the instant embodiment will be described. In this figure, the steps S6 to S9 are the same as those denoted by like reference characters in FIG. 11.

First, the deterioration parameter calculating means 60 calculates as a deterioration parameter value a time interval ratio $\gamma(=\tau_1/\tau_2)$ between a time interval $\tau_1$ at which the first air-fuel ratio signal V1 intersects the target value VR1 for the first air-fuel ratio signal V1 and a time interval $\tau_2$ at which the second air-fuel ratio signal V2 intersects the second target value VR2, and the filtering means 61 generates the filtered parameter value $\gamma f$ by filtering the deterioration parameter value $\gamma$.

The comparison/decision means 62 fetches the filtered parameter value $\gamma f$ in a step S51 to make decision as to whether the filtered parameter value $\gamma f$ is greater than a predetermined value A' (step S52).

When the decision step S52 results in "NO", i.e., when $\gamma f \leq A'$, the catalytic converter 10 is determined to be normal (step S6). On the other hand, when $\gamma f > A'$, deterioration of the catalytic converter 10 is decided in a step S8, whereby the abnormality signal E is generated to light the alarm lamp 19 (step S9).

Figure 20:
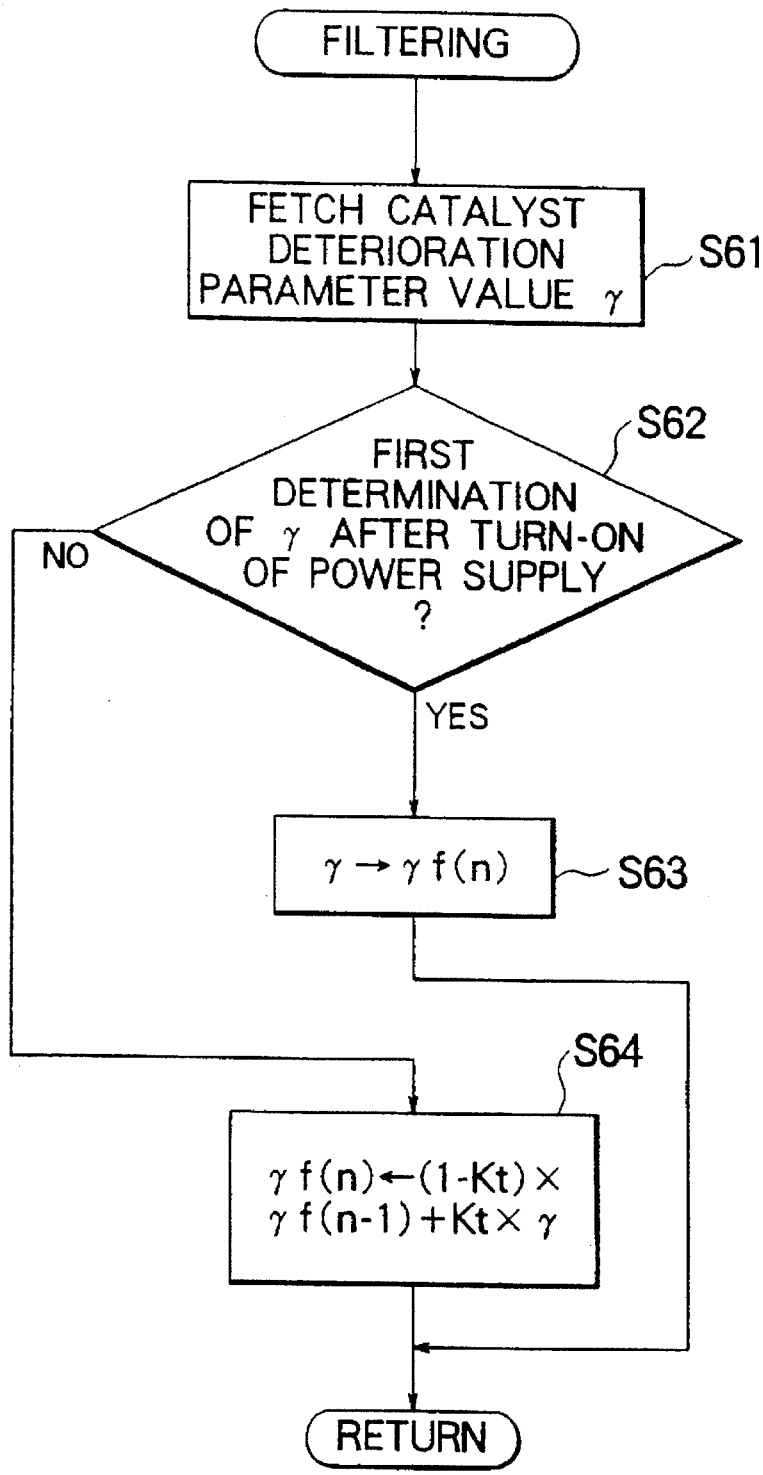
FIG. 20 is a flow chart illustrating a filtering operation performed by a filtering means of the apparatus shown in FIG. 18.

FIG. 20 is a flow chart illustrating the filtering operation performed by the filtering means 61 shown in FIG. 18. This routine is executed periodically at a time interval of e.g., ten seconds which is required to calculate the deterioration parameter value $\gamma(=\tau_1/\tau_2)$ defined hereinbefore.

At first, the deterioration parameter value $\gamma$ is fetched in a step S61. In a next step S62, it is checked whether this fetching of the deterioration parameter value $\gamma$ is the first time after turn-on of the power supply, i.e., this is the first time for calculating the deterioration parameter value $\gamma$.

When the answer of the step S62 is "YES", the deterioration parameter value $\gamma$ as fetched is set as an initial value for the current filtered parameter value $\gamma f(n)$ in a step S63, whereupon the processing comes to an end. At that time, the current filtered parameter value $\gamma f(n)$ is registered as a preceding filtered parameter value $\gamma f(n-1)$.

On the other hand, when the decision step S62 results in negation "NO", the current filtered parameter value $\gamma f(n)$ is determined by a linear filter operation given by the following expression 4 in a step S64.

$$\gamma f(n) = (1-Kt) \times \gamma f(n-1) + Kt \times \gamma \quad (4)$$

In the above expression, Kt represents a filter coefficient which is set in a range of 0<Kt<1. Owing to this coefficient Kt, the current filtered parameter value $\gamma f(n)$ becomes stable after a same deterioration parameter value $\gamma$ has been determined several times.

Figure 21:
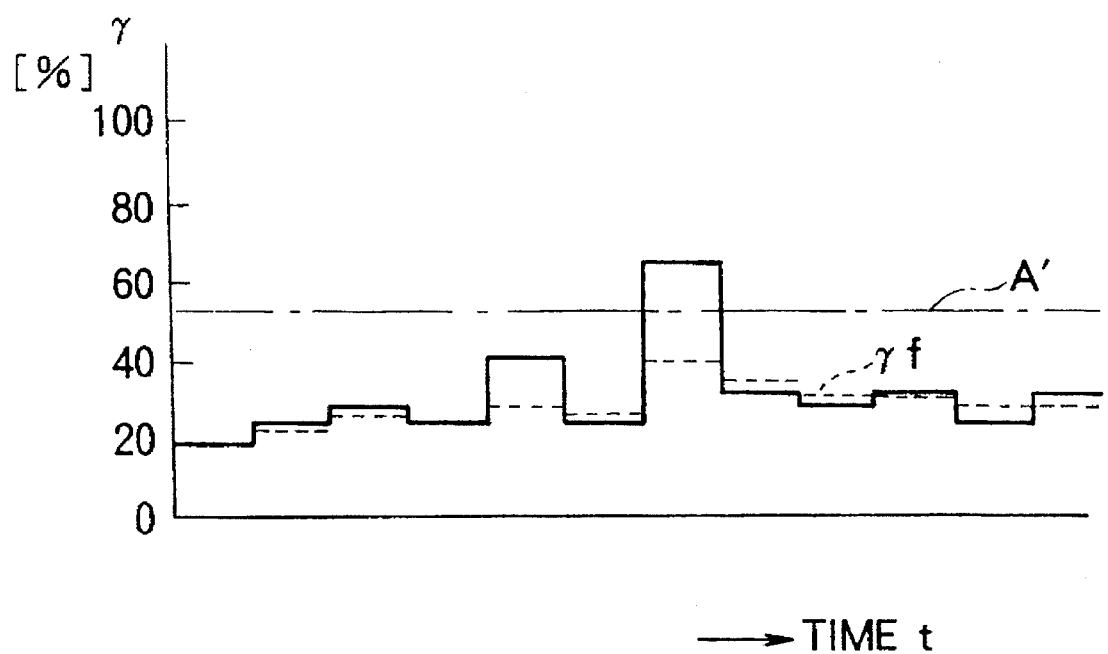
FIG. 21 is a view for illustrating graphically smoothing of a catalyst deterioration parameter.

In this manner, the filtered parameter value $\gamma f$ has a waveform smoothed as indicated by a broken line curve shown in FIG. 21, whereby fluctuation of the deterioration parameter value $\gamma$ under the influence of changes in the engine state can be suppressed to a minimum. In other words, even when the level of the deterioration parameter value $\gamma$ varies transiently, as indicated by a solid line curve in FIG. 21, the filtered parameter value $\gamma f$ does not exceeds a predetermined value A' so long as the catalytic converter 10 is normal. Thus, the erroneous deterioration decision by the comparison/decision means 62 can be prevented, whereby the reliability of the catalyst deterioration diagnosis apparatus can significantly be enhance.

Embodiment 15

In the case of the apparatus according to the fourteenth embodiment, deterioration of the catalytic converter 10 is determined when the filtered parameter value $\gamma f$ exceeds the predetermined value A'. It is however noted that there arises possibility of erroneous decision when the filtered parameter value $\gamma f$ exceeds transiently the value A' for some reason. Accordingly, it is taught by the invention incarnated in the instant embodiment that the deterioration decision is made when the filtered parameter value $\gamma f$ continues to exceed the predetermined value A' for a predetermined time or period to thereby exclude the erroneous decision.

Figure 22:
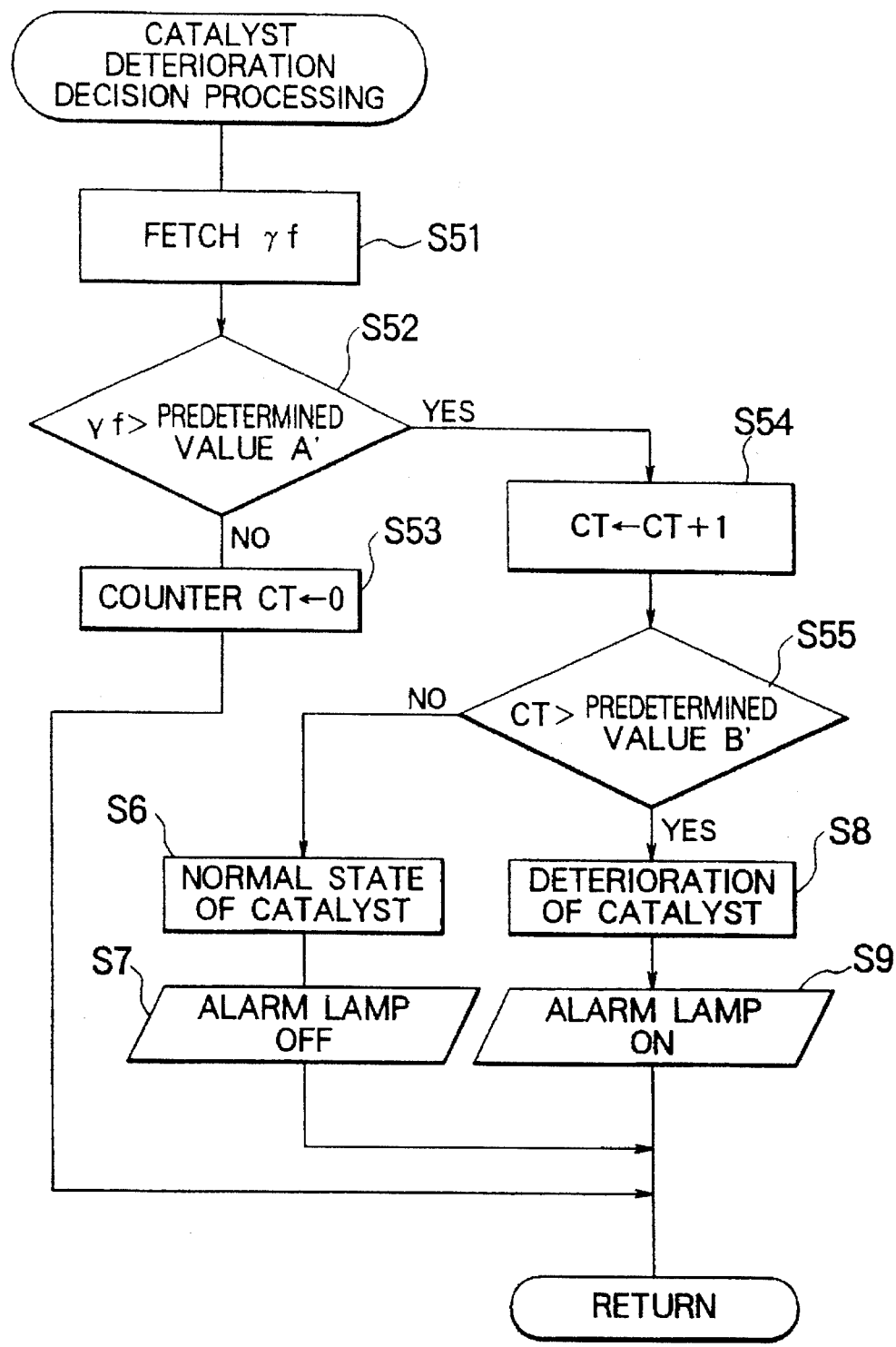
FIG. 22 is a flow chart for illustrating a catalytic converter deterioration diagnosis processing according to a fifteenth embodiment of the invention;]

FIG. 22 is a flow chart for illustrating a catalyst deterioration decision processing according to the instant embodiment. In the figure, S51 and S52 denote the same steps as denoted by like reference characters in FIG. 19.

In the apparatus according to the instant embodiment, a time counter CT for time measurement is additionally provided. This counter CT is reset to zero when the decision step S52 results in negation (NO), i.e., when $\gamma f \leq A'$ (step S52), whereupon this processing comes to an end.

On the other hand, when the decision S52 step results in "YES", i.e., when γf>A', the counter CT is incremented (step S52), which is then followed by a step S55 where it is checked whether the value of the counter CT exceeds a predetermined value B (step S55). Thus, in the step S55, the time for which the filtered parameter value γf continues to exceed the predetermined value A' is measured. In the step S55, the predetermined value is set equal to a value representing a predetermined time, e.g., a count value of "5".

When the decision step S55 results in "NO", indicating that CT≦B, the catalytic converter 10 is decided as being normal (step S6). If otherwise, deterioration of the catalytic converter 10 is determined in the step S8.

In this manner, deterioration of the catalytic converter 10 is determined only when the filtered parameter value γf continues to exceed the predetermined value A' for the predetermined time B, whereby reliability of the apparatus can further be improved.

Embodiment 16

According to this embodiment, there is provided a means for detecting magnitude of change of the filtered parameter value γf for the same purpose as in the case of the fifteenth embodiment.

Figure 23:
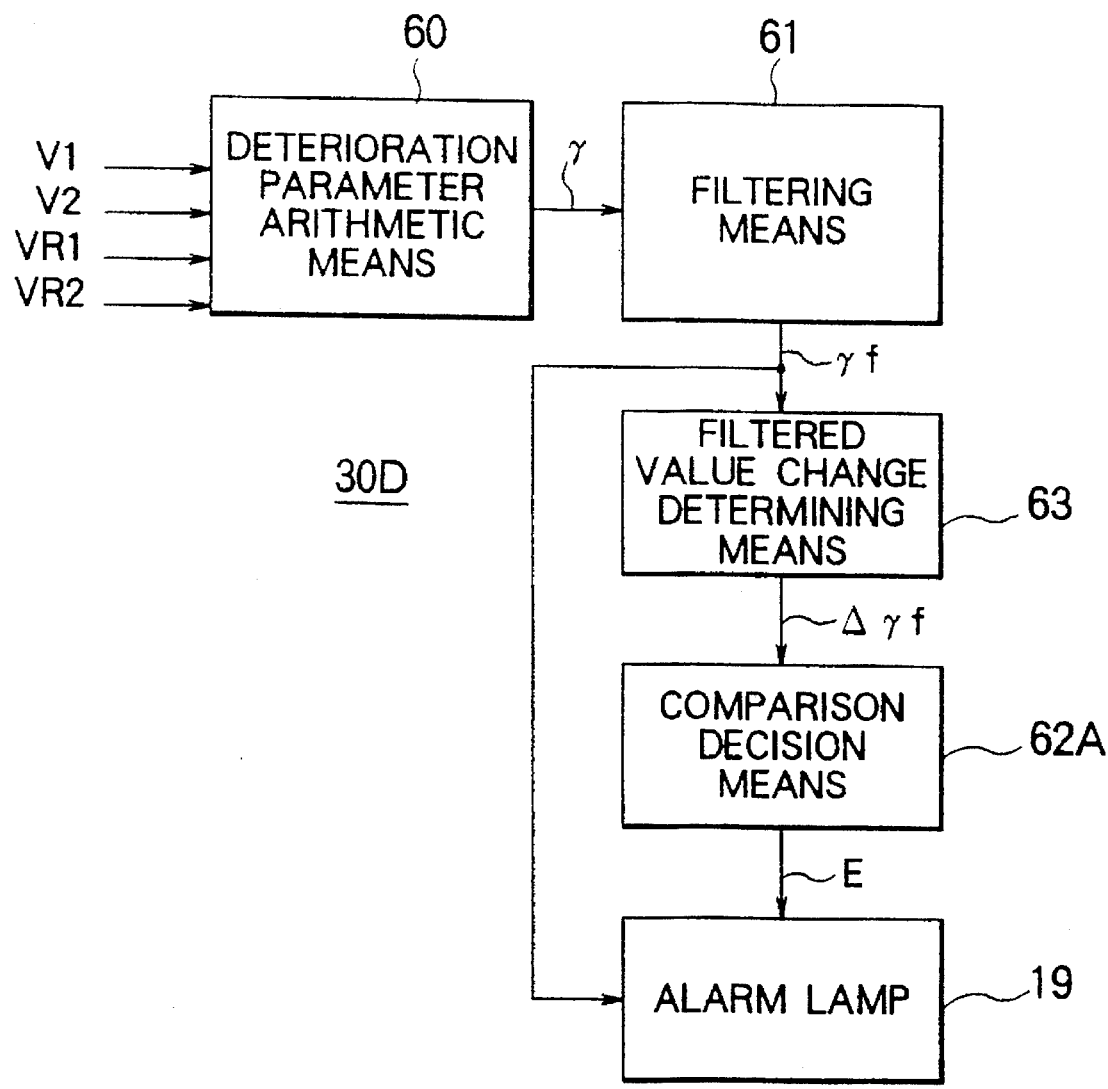
FIG. 23 is a functional block diagram showing a catalytic converter deterioration diagnosis apparatus according to a sixth embodiment.
Figure 24:
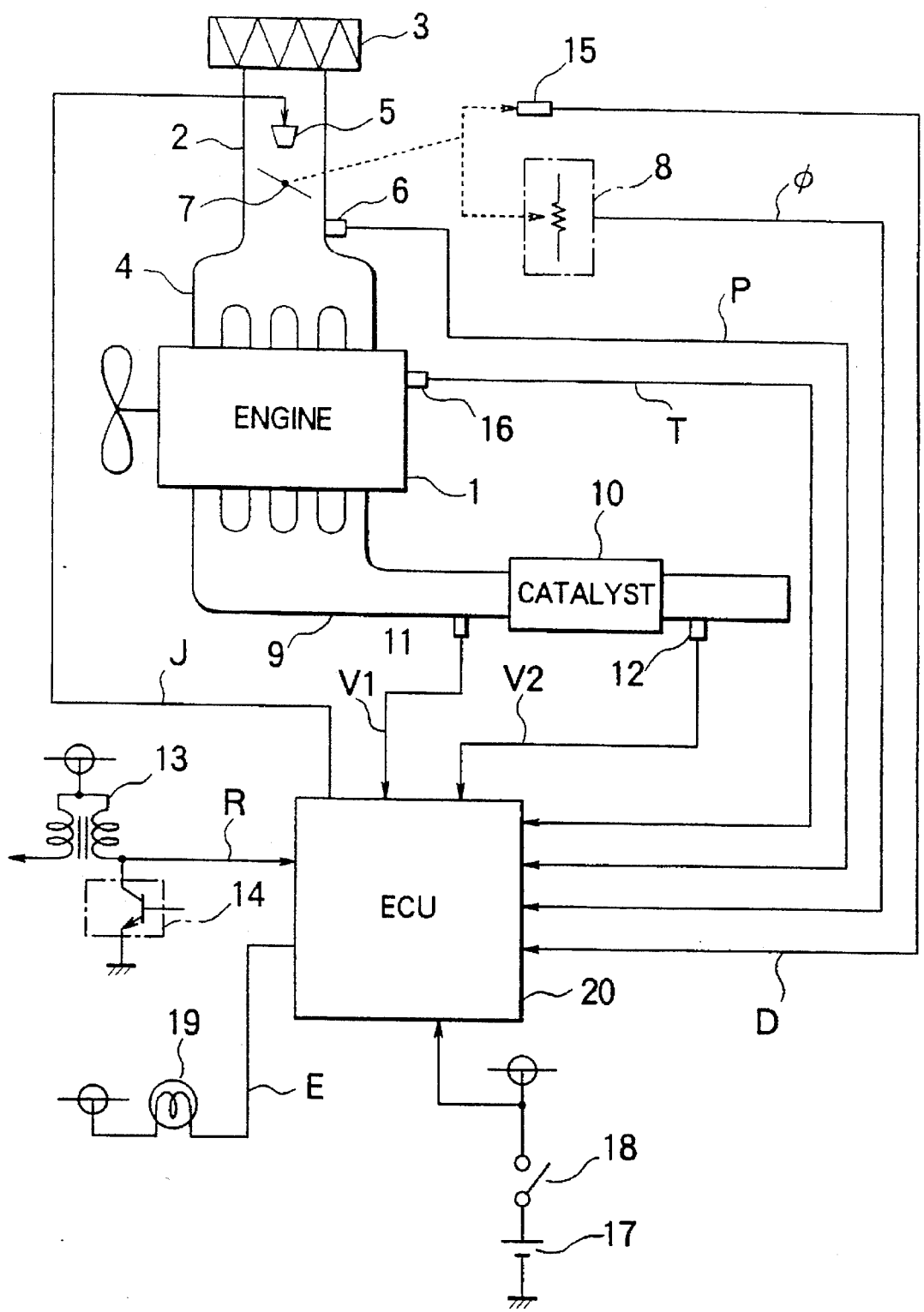
FIG. 24 is a schematic diagram showing a general arrangement of control system to which the present invention can be applied.

FIG. 23 is a functional block diagram showing an arrangement of the catalyst deterioration detecting apparatus according to the instant embodiment. In the figure, 62A denotes an arithmetic comparison means corresponding to the means 62 shown in FIG. 18. A filtered value change calculating means 63 is provided for calculating a change Δγf of the filtered parameter value γf. This calculating means 63 is incorporated in a microcomputer generally denoted by 30D together with deterioration parameter calculating means 60, 61 and the arithmetic comparison means 62A.

The filtered value change calculating means 63 serves to calculate magnitude of the change Δγf on the basis of a difference between the preceding and current filtered parameter values γf supplied from the output of the filtering means 61 in accordance with the following expression (5).

$$\Delta\gamma f = |\gamma f(n) - \gamma f(n-1)| \quad (5)$$

The arithmetic comparison means 62A fetches the change quantity Δγf together with the filtered parameter value γf and decides that the filtered parameter value γf does not represent a temporary result of operation when the change quantity Δγf is not greater than a permissible upper limit value, whereon the filtered parameter value γf is compared with the predetermined value A'.

On the other hand, when the change quantity Δγf exceeds the permissible upper limit, the corresponding change is regarded as a transient, whereby the deterioration decision is inhibited. By virtue of this feature, the reliability of the catalytic converter deterioration decision can be enhanced.

The instant embodiment may be combined with the sixteenth embodiment in order to further increase the reliability of the catalytic converter deterioration decision.

In the case of the fifteenth to seventeenth embodiments, the interval ratio γ(τ₁/τ₂) has been employed as the deterioration parameter value. However, it goes without saying that similar action and effect can be attained by using other deterioration parameter.

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

We claim:

1. A dual-sensor type air-fuel ratio control system for an internal combustion engine, comprising:

a catalytic converter disposed within an exhaust pipe of said engine for purifying an exhaust gas;

a first air-fuel ratio disposed upstream of said catalytic converter for detecting the upstream concentration of a particular component of said exhaust gas to output a first air-fuel ratio signal indicating said upstream concentration;

a second air-fuel ratio sensor disposed downstream of said catalytic converter for detecting the downstream concentration of said particular component of said exhaust gas to thereby output a second air-fuel ratio signal indicating said downstream concentration; and an electronic control unit for controlling a target air-fuel ratio of a mixture supplied to said engine by arithmetically determining a target air-fuel ratio control quantity on the basis of said first and second air-fuel ratio signals;

wherein said electronic control unit includes:

first arithmetic means for determining a first air-fuel ratio control quantity on the basis of said first air-fuel ratio signal;

second arithmetic means for determining a second air-fuel ratio control quantity on the basis of said second air-fuel ratio signal;

correcting means for correcting said first air-fuel ratio control quantity with said second air-fuel ratio control quantity to thereby determine said target air-fuel ratio control quantity on the basis of said correction of said first air-fuel ratio control quantity; and filtering means for filtering said first air-fuel ratio signal.

2. A dual-sensor type air-fuel ratio control system for an internal combustion engine according to claim 1,
   wherein said correcting means includes addition means for adding together said first air-fuel ratio control quantity and said second air-fuel ratio control quantity.

3. A dual-sensor type air-fuel ratio control system for an internal combustion engine according to claim 1,
   further comprising control quantity conversion means for converting said target air-fuel ratio control quantity into a fuel injection control quantity for controlling injection of a fuel into said engine by taking into consideration at least a parameter indicating an operation state of said engine.

4. A dual-sensor type air-fuel ratio control system for an internal combustion engine according to claim 1,
   wherein said filtering means is so designed as to have a time constant in a range of 30 milliseconds to 100 milliseconds in the case where a response time of said first air-fuel ratio sensor varies in a ranges from 100 milliseconds to 1 second.

5. A dual-sensor type air-fuel ratio control system for an internal combustion engine according to claim 1,
   wherein said second air-fuel ratio signal is corrected with a target value set therefor in dependence on an operation state of said engine.

* * * * *